(12) United States Patent
Asakura

(10) Patent No.: US 10,089,051 B2
(45) Date of Patent: Oct. 2, 2018

(54) COMMUNICATION DEVICE COMMUNICATING TARGET DATA WITH EXTERNAL DEVICE ACCORDING TO NEAR FIELD COMMUNICATION

(71) Applicant: Brother Kogyo Kabushiki Kaisha, Nagoya-shi, Aichi-ken (JP)

(72) Inventor: Hirotaka Asakura, Nagoya (JP)

(73) Assignee: Brother Kogyo Kabushiki Kaisha, Nagoya-shi, Aichi-ken (JP)

(*) Notice: Subject to any disclaimer, the term of this patent is extended or adjusted under 35 U.S.C. 154(b) by 0 days.

(21) Appl. No.: 15/609,339

(22) Filed: May 31, 2017

(65) Prior Publication Data

US 2017/0269892 A1 Sep. 21, 2017

Related U.S. Application Data

(63) Continuation of application No. 15/162,995, filed on May 24, 2016, now Pat. No. 9,696,956, which is a
(Continued)

(30) Foreign Application Priority Data

Jul. 3, 2012 (JP) .................................. 2012-149050

(51) Int. Cl.
*G06F 3/12* (2006.01)
*G06K 15/00* (2006.01)
(Continued)

(52) U.S. Cl.
CPC .......... *G06F 3/1292* (2013.01); *G06F 3/1211* (2013.01); *G06F 3/1236* (2013.01);
(Continued)

(58) Field of Classification Search
CPC .... G06F 3/1292; G06F 3/1211; G06F 3/1236; H04W 76/043; H04W 76/023;
(Continued)

(56) References Cited

U.S. PATENT DOCUMENTS 7,209,706 B2  4/2007  Fujii et al.
7,346,061 B2  3/2008  Takayama et al.
(Continued)

FOREIGN PATENT DOCUMENTS

CN  101253469 A  8/2008
CN  101790183 A  7/2010
(Continued)

OTHER PUBLICATIONS

Mar. 15, 2013—(US) Co-Pending U.S. Appl. No. 13/834,434.
(Continued)

*Primary Examiner* — Qian Yang
(74) *Attorney, Agent, or Firm* — Banner & Witcoff, Ltd.

(57) ABSTRACT

A communication device may communicate a first establishing command with an external device via a NFC interface so as to establish a first communication link, receive first target data from the external device via the NFC interface by using the first communication link, process a specific command included in the first target data so as to create second target data, select one type of disconnection method according to information included in the first target data from among plural types of disconnection methods for disconnecting the first communication link, and disconnect the first communication link by using the selected one type of disconnection method. The communication device may communicate a second establishing command with the external device via the NFC interface so as to establish a
(Continued)

second communication link, and send the second target data to the external device via the NFC interface by using the second communication link.

13 Claims, 12 Drawing Sheets

Related U.S. Application Data continuation of application No. 14/663,923, filed on Mar. 20, 2015, now Pat. No. 9,354,835, which is a continuation of application No. 13/933,419, filed on Jul. 2, 2013, now Pat. No. 8,994,996.

(51) Int. Cl.
*H04B 5/00* (2006.01)
*H04W 76/23* (2018.01)
*H04W 4/80* (2018.01)
*H04W 76/14* (2018.01)

(52) U.S. Cl.
CPC ............ *G06K 15/4045* (2013.01); *H04B 5/00* (2013.01); *H04B 5/0031* (2013.01); *H04W 4/80* (2018.02); *H04W 76/14* (2018.02); *H04W 76/23* (2018.02)

(58) Field of Classification Search
CPC ....... H04W 4/008; H04B 5/0031; H04B 5/00; G06K 15/4045
See application file for complete search history.

(56) References Cited

U.S. PATENT DOCUMENTS

| | | |
|---|---|---|
| 2003/0007606 A1 | 1/2003 | Suder et al. |
| 2004/0116074 A1 | 6/2004 | Fujii et al. |
| 2004/0192264 A1 | 9/2004 | Liu et al. |
| 2004/0248514 A1 | 12/2004 | Idani et al. |
| 2005/0077356 A1 | 4/2005 | Takayama et al. |
| 2005/0088709 A1 | 4/2005 | Kizaki et al. |
| 2006/0101280 A1 | 5/2006 | Sakai |
| 2006/0126118 A1 | 6/2006 | Nagata |
| 2006/0245402 A1 | 11/2006 | Fujii et al. |
| 2007/0051803 A1 | 3/2007 | Tada et al. |
| 2007/0190937 A1 | 8/2007 | Takayama |
| 2007/0190939 A1 | 8/2007 | Abel |
| 2007/0230332 A1 | 10/2007 | Fukasawa |
| 2008/0052710 A1 | 2/2008 | Iwai et al. |
| 2008/0084578 A1 | 4/2008 | Walker et al. |
| 2008/0117847 A1 | 5/2008 | Hamada |
| 2008/0218810 A1 | 9/2008 | Itoh |
| 2008/0222711 A1 | 9/2008 | Michaelis |
| 2008/0231900 A1 | 9/2008 | Abe |
| 2008/0232405 A1 | 9/2008 | Gallo |
| 2008/0299907 A1 | 12/2008 | Takayama |
| 2009/0009299 A1 | 1/2009 | Ikeda et al. |
| 2009/0021764 A1 | 1/2009 | Kano |
| 2009/0023476 A1 | 1/2009 | Saarisalo et al. |
| 2009/0024768 A1 | 1/2009 | Maruyama et al. |
| 2009/0033972 A1 | 2/2009 | Kato |
| 2009/0036056 A1 | 2/2009 | Oshima et al. |
| 2009/0052348 A1 | 2/2009 | Kato et al. |
| 2009/0066998 A1 | 3/2009 | Kato |
| 2009/0073482 A1 | 3/2009 | Tsuchiya |
| 2009/0103124 A1 | 4/2009 | Kimura et al. |
| 2009/0147803 A1 | 6/2009 | Takayama |
| 2009/0193500 A1 | 7/2009 | Griffin et al. |
| 2009/0271519 A1 | 10/2009 | Helvick |
| 2009/0298426 A1 | 12/2009 | Helvick |
| 2010/0050189 A1 | 2/2010 | Sng |
| 2010/0058359 A1 | 3/2010 | Ferlitsch |
| 2010/0069008 A1 | 3/2010 | Oshima et al. |
| 2010/0077031 A1 | 3/2010 | Yoneda et al. |
| 2010/0078471 A1 | 4/2010 | Lin et al. |
| 2010/0078472 A1 | 4/2010 | Lin et al. |
| 2010/0082485 A1 | 4/2010 | Lin et al. |
| 2010/0130127 A1 | 5/2010 | Takayama |
| 2010/0151790 A1 | 6/2010 | Hoeksel et al. |
| 2010/0188695 A1 | 7/2010 | Okigami |
| 2010/0207735 A1 | 8/2010 | Kim |
| 2010/0207742 A1 | 8/2010 | Buhot et al. |
| 2010/0221999 A1 | 9/2010 | Braun et al. |
| 2010/0241857 A1 | 9/2010 | Okude et al. |
| 2010/0311330 A1 | 12/2010 | Aibara et al. |
| 2010/0318712 A1 | 12/2010 | Boldyrev et al. |
| 2011/0002005 A1 | 1/2011 | Ashmore |
| 2011/0026068 A1 | 2/2011 | Yoshida |
| 2011/0028091 A1 | 2/2011 | Higgins et al. |
| 2011/0065385 A1 | 3/2011 | Geslin et al. |
| 2011/0075186 A1 | 3/2011 | Azuma |
| 2011/0090830 A1 | 4/2011 | Churei |
| 2011/0116125 A1 | 5/2011 | Park |
| 2011/0177780 A1 | 7/2011 | Sato et al. |
| 2011/0210618 A1 | 9/2011 | Takasu |
| 2011/0226853 A1 | 9/2011 | Soh et al. |
| 2011/0234013 A1 | 9/2011 | Hatakeyama |
| 2011/0258322 A1 | 10/2011 | Luzzatti et al. |
| 2011/0267636 A1 | 11/2011 | Kamasuka |
| 2011/0292445 A1 | 12/2011 | Kato |
| 2012/0034868 A1 | 2/2012 | Fine et al. |
| 2012/0069772 A1 | 3/2012 | Byrne et al. |
| 2012/0100803 A1 | 4/2012 | Suumaki et al. |
| 2012/0101944 A1 | 4/2012 | Lin et al. |
| 2012/0135681 A1 | 5/2012 | Adams et al. |
| 2012/0166338 A1 | 6/2012 | Agnelli et al. |
| 2012/0194864 A1 | 8/2012 | Oshima et al. |
| 2012/0208461 A1 | 8/2012 | Choi et al. |
| 2012/0212325 A1 | 8/2012 | Kanemoto |
| 2012/0297048 A1 | 11/2012 | Hsu |
| 2012/0300245 A1 | 11/2012 | Chatierjee et al. |
| 2012/0329390 A1 | 12/2012 | Kim |
| 2012/0330784 A1* | 12/2012 | Nahidipour ........ G06Q 20/3278 705/26.41 |
| 2013/0009752 A1 | 1/2013 | Finkenzeller et al. |
| 2013/0040565 A1 | 2/2013 | Suzuki |
| 2013/0077124 A1 | 3/2013 | Vojak |
| 2013/0080276 A1 | 3/2013 | Granbery |
| 2013/0083358 A1 | 4/2013 | Suzuki |
| 2013/0165042 A1 | 6/2013 | Gillespie et al. |
| 2013/0166969 A1 | 6/2013 | Zhang et al. |
| 2013/0196595 A1 | 8/2013 | Byrne et al. |
| 2013/0203347 A1 | 8/2013 | Moosavi |
| 2013/0204726 A1 | 8/2013 | Cruttenden et al. |
| 2013/0215467 A1 | 8/2013 | Fein et al. |
| 2013/0229683 A1 | 9/2013 | Nakayama |
| 2013/0229684 A1 | 9/2013 | Yasuzaki |
| 2013/0229690 A1 | 9/2013 | Sumita et al. |
| 2013/0244578 A1 | 9/2013 | Bacioccola |
| 2013/0258390 A1 | 10/2013 | Suzuki et al. |
| 2013/0260683 A1 | 10/2013 | Suzuki et al. |
| 2013/0260684 A1 | 10/2013 | Suzuki et al. |
| 2013/0311313 A1 | 11/2013 | Laracey |
| 2014/0002850 A1 | 1/2014 | Kang |
| 2014/0004793 A1 | 1/2014 | Bandyopadhyay et al. |
| 2014/0038517 A1 | 2/2014 | Asakura |
| 2014/0038518 A1 | 2/2014 | Asakura |
| 2014/0038519 A1 | 2/2014 | Asakura |
| 2014/0047038 A1 | 2/2014 | Piratla et al. |
| 2014/0063537 A1 | 3/2014 | Nishikawa et al. |
| 2014/0068719 A1 | 3/2014 | Kiukkonen et al. |
| 2014/0085654 A1 | 3/2014 | Miyazaki |
| 2014/0104635 A1 | 4/2014 | Nishikawa |
| 2014/0219453 A1 | 8/2014 | Neafsey et al. |
| 2014/0256251 A1 | 9/2014 | Caceres et al. |
| 2014/0293980 A1 | 10/2014 | Shibata |
| 2014/0297892 A1 | 10/2014 | Kaigawa |
| 2014/0304596 A1 | 10/2014 | Chandran et al. |
| 2014/0368859 A1 | 12/2014 | Gutnik et al. |
| 2014/0378052 A1 | 12/2014 | Hamada |
| 2015/0093992 A1 | 4/2015 | Tanaka |
| 2015/0126115 A1 | 5/2015 | Yun et al. |
| 2015/0189595 A1 | 7/2015 | Shibao |

(56) References Cited

U.S. PATENT DOCUMENTS

| | | |
|---|---|---|
| 2015/0205550 A1 | 7/2015 | Lee et al. |
| 2015/0208245 A1 | 7/2015 | Robinton et al. |
| 2015/0213436 A1 | 7/2015 | Griffin et al. |
| 2015/0220290 A1 | 8/2015 | Park et al. |
| 2015/0270912 A1 | 9/2015 | Dhayni et al. |
| 2015/0317116 A1 | 11/2015 | Suzuki et al. |
| 2015/0327172 A1 | 11/2015 | Kusakabe |
| 2015/0350905 A1 | 12/2015 | Suzuki |

FOREIGN PATENT DOCUMENTS

| | | | |
|---|---|---|---|
| EP | 2296292 A1 | 3/2011 | |
| EP | 2645265 A2 | 10/2013 | |
| JP | H11-154061 A | 6/1999 | |
| JP | 2000-228666 A | 8/2000 | |
| JP | 2004-200840 A | 7/2004 | |
| JP | 200770047 A | 3/2007 | |
| JP | 2007079639 A | 3/2007 | |
| JP | 2007-166538 A | 6/2007 | |
| JP | 2007221682 A | 8/2007 | |
| JP | 2009-037566 A | 2/2009 | |
| JP | 2009-135865 A | 6/2009 | |
| JP | 2010501135 A | 1/2010 | |
| JP | 2011-044092 A | 3/2011 | |
| JP | 201187249 A | 4/2011 | |
| JP | 2011073272 A | 4/2011 | |
| JP | 2011-146991 A | 7/2011 | |
| JP | 201260609 A | 3/2012 | |
| JP | 2013505670 A | 2/2013 | |
| JP | 2013-132491 A | 7/2013 | |
| JP | 2013-187565 A | 9/2013 | |
| JP | 2013-214139 A | 10/2013 | |
| JP | 2013-214804 A | 10/2013 | |
| JP | 2014071488 A | 4/2014 | |
| NO | 2005/017738 A1 | 2/2005 | |
| WO | 03061205 A1 | 7/2003 | |
| WO | 2008021032 A2 | 2/2008 | |
| WO | 2011037725 A2 | 3/2011 | |

OTHER PUBLICATIONS

Sep. 23, 2013—(EP) Search Report—App 13174778.4.
May 22, 2015—(US) Non-Final Office Action—U.S. Appl. No. 13/834,434.
Aug. 31, 2015—(US) Non-Final Office Action—U.S. Appl. No. 14/663,923.
Aug. 5, 2014—(US) Non-Final Office Action—U.S. Appl. No. 13/933,419.
Jan. 29, 2016—(US) Notice of Allowance—U.S. Appl. No. 14/663,923.
Jan. 12, 2016—(JP) Notification of Reasons for Rejection—App 2012-082819—Eng Tran.
Feb. 25, 2016—(US) Final Office Action—U.S. Appl. No. 13/834,434.
Anonymous,:"Near Field Communication White Paper", Feb. 12, 2004, URL:http://www.ecma-international.org/activities/Communications/2004tg19-001.pdf [retrieved on Mar. 6, 2006].
Wi-Fi Peer-to-Peer (P2P) Technical Specification Version 1.1 2010, pp. 1-159.
Jan. 17, 2014—(EP) Search Report—Application No. 13179289.7. Smart Cards; UICC-CLF interface; Host Controller Interface P2P LNC Protocol, Vo. 1.0, Jan. 11, 2008, pp. 1-33.
May 9, 2014—(US) Non-Final Office Action—U.S. Appl. No. 13/834,423.
May 9, 2014—(US) Non-Final Office Action—U.S. Appl. No. 13/833,236.
Jul. 23, 2013—(EP) Extended Search Report—Application No. 13161732.6.
Sep. 4, 2014—(US) Final Office Action—U.S. Appl. No. 13/834,423.
Oct. 27, 2014—(EP) Office Action—App 13159607.4.
Oct. 20, 2014—(US) Notice of Allowance—U.S. Appl. No. 13/833,236.
Dec. 12, 2014—(US) Notice of Allowance—U.S. Appl. No. 13/834,423.
Information Technology—Telecommunications and information exchange between systems—Near Field Communication Interface and Protocol—2 (NFCIP-2), ISO/IEC 21481, Second edition, Jul. 1, 2012.
Information Technology—Telecommunications and information exchange between systems—Near Field Communication—Interface and Protocol (NFCIP-1), ISO/IEC 18092, Second edition, Mar. 15, 2013.
Mar. 13, 2014—(US) Co-pending U.S. Appl. No. 14/208,220.
Nosowitz, D., "Everything You Need to Know about Near Field Communication," Popular Science, posted Mar. 1, 2011.
Mar. 31, 2015—(US) Notice of Allowance—U.S. Appl. No. 13/834,423.
Mar. 6, 2015—(CN) Notification of First Office Action—App 201310097370.7.
Apr. 15, 2015—(US) Non-Final Office Action—U.S. Appl. No. 13/959,786.
Sep. 9, 2014 (US) Co-pending U.S. Appl. No. 14/498,213 as filed.
Requirement for Election issued in U.S. Appl. No. 13/834,423, dated Feb. 24, 2014.
Co-pending U.S. Appl. No. 13/833,236, filed Mar. 15, 2013.
Mar. 26, 2015—(US) Co-pending U.S. Appl. No. 14/669,553.
Sep. 30, 2015—(US) Notice of Allowance—U.S. Appl. No. 14/208,220.
Oct. 2, 2015—(US)—Final Office Action—U.S. Appl. No. 13/959,786.
Oct. 9, 2015—(US) Non-Final Office Action—U.S. Appl. No. 14/706,368.
Aug. 31, 2011—NFC Forum, Simple NDEF Exchange Protocol Technical Specification, NFC Forum, SNEP 1.0, NFCForum-TS-SNEP_1.0.
Oct. 8, 2015—(EP) Extended European Search Report—App 15169695.2.
Dec. 22, 2015—(JP) Notification of Reasons for Rejection—App 2012-082818—Eng Tran.
Dec. 22, 2015—(CN) Notification of First Office action—App 201310339554.X—Eng Tran.
Feb. 17, 2016—(US)—Final Office Action—U.S. Appl. No. 14/706,368.
Jan. 17, 2014—(EP) Extended Search Report—App 13179157.6.
Aug. 31, 2011—"Simple NDEF Exchange Protocol"—Technical Specification, SNEP 1.0, pp. 1-20.
Feb. 13, 2015—(US) Non-Final Office Action—U.S. Appl. No. 13/957,479.
Jan. 17, 2014—(EP) Extended Search Report—App 13179154.3.
Feb. 12, 2015—(US) Non-Final Office Action—U.S. Appl. No. 13/957,490.
Nov. 17, 2010—"NFC Digital Protocol," NFCForum-TS-DigitalProtocol-1.0.
Jul. 13, 2015—(US) Final Office Action—U.S. Appl. No. 13/957,479.
Jul. 16, 2015—(US) Final Office Action—U.S. Appl. No. 13/957,490.
Dec. 17, 2015—(US) Notice of Allowance—U.S. Appl. No. 13/957,479.
Oct. 14, 2015—(EP) Office Action—App 13179157.6.
Jul. 4, 2012—Jara, Antonio et al., "Interaction of patients with breathing problems through NFC in Ambient Assisted Living environements," 2012 Sixth International Conference on Innovative Mobile and Internet Services in Ubiquitous Computing, pp. 892-897, XP032234827, DOI: 10.1109/IMIS.2012.150 ISBN: 978-1-4673-1328-5.
May 14, 2012—Monteiro, David et al., "A Secure NFC Application for Credit Transfer Among Mobile Phones," 2012 International Conference on Computer Information and Telecommunication Systems (CITS), IEEE, pp. 1-5, XP032188431, DOI: 10.1109/CITS.2012.6220369 ISBN: 978-1-4673-1549-4.
Jul. 18, 2017—(JP) Notification of Rejection—App 2016-156230—Eng Tran.
Aug. 1, 2017—(US) Notice of Allowance—U.S. Appl. No. 14/669,553.
Aug. 2, 2017—(EP) Office Action—App 13174778.4.
Jul. 27, 2017—(EP) Office Action—App 13161732.6.
Aug. 15, 2017—(US) Non-Final Office Action—U.S. Appl. No. 14/498,213.
Sep. 1, 2017—(US) Notice of Allowance—U.S. Appl. No. 15/287,054.
Sep. 27, 2017—(US) Notice of Allowance—U.S. Appl. No. 15/617,354.
Mar. 8, 2016—(JP) Notification of Reasons for Rejection—App 2012-173269.
Jan. 25, 2016—(US) Non-Final Office Action—U.S. Appl. No. 13/957,490.

(56) References Cited

OTHER PUBLICATIONS

Apr. 26, 2016—(US) Non-Final Office Action—U.S. Appl. No. 13/959,786.
May 6, 2016—(US) Non-Final Office Action—U.S. Appl. No. 13/957,479.
May 11, 2016—(US) Notice of Allowance—U.S. Appl. No. 14/706,368.
May 6, 2016—(US) Non-Final Office Action—U.S. Appl. No. 14/208,220.
Mar. 1, 2016—(JP) Notice of Reasons for Rejection—App 2012-193091—Eng Tran.
Jul. 2, 2013—(US) Co-pending U.S. Appl. No. 13/933,419.
Jun. 20, 2016—(US) Final Office Action—U.S. Appl. No. 13/957,490.
May 17, 2016—(JP) Notification of Reasons for Rejection—App 2012-082818—Eng Trans.
May 3, 2016—(CN) Office Action—App 201310084346.X—Eng Tran.
Jun. 22, 2016—(US) Notice of Allowance—U.S. Appl. No. 14/706,368.
Aug. 9, 2016—(US) Notice of Allowance—U.S. Appl. No. 13/957,479.
Aug. 11, 2016—(US) Notice of Allowance—U.S. Appl. No. 13/959,786.
Aug. 23, 2016—(US) Non-Final Office Action—U.S. Appl. No. 14/498,213.
Jul. 7, 2010—NFC Forum Connection Handover Technical Specification 1.2.
Aug. 24, 2016—(US) Notice of Allowance—U.S. Appl. No. 14/208,220.
Aug. 25, 2016—(US) Non-Final Office Action—U.S. Appl. No. 13/834,434.
Sep. 6, 2016—(US) Non-Final Office Action—U.S. Appl. No. 15/132,432.
Aug. 31, 2011—NFC Forum Simlple NDEF Exchange Protocol.
Provisional U.S. Appl. No. 61/601,496, filed Feb. 21, 2012, Specification.
Provisional U.S. Appl. No. 61/601,496, filed Feb. 21, 2012, Drawings.
Nov. 3, 2016—(US) Non-Final Office Action—U.S. Appl. No. 15/162,995.
Nov. 2, 2016—(US) Non-Final Office Action—U.S. Appl. No. 14/669,553.
Nov. 18, 2016—(US) Notice of Allowance—U.S. Appl. No. 14/208,220.
Dec. 6, 2016—(US) Notice of Allowance—U.S. Appl. No. 14/706,368.
Dec. 2, 2016—(US) Notice of Allowance—U.S. Appl. No. 13/957,479.
Dec. 22, 2016—(US) Notice of Allowance—U.S. Appl. No. 13/957,490.
Jan. 10, 2017—(US) Notice of Allowance—U.S. Appl. No. 13/834,434.
Nov. 25, 2016—(CN) Office Action—App 201310084346.X—Eng Tran.
Feb. 7, 2017—(JP) Notification of Reasons for Rejection—App 2013-204535—Eng Trans.
Mar. 1, 2017—(US) Notice of Allowance—U.S. Appl. No. 15/162,995.
Apr. 21, 2017—(US) Final Office Action—U.S. Appl. No. 14/498,213.
May 4, 2017—(US) Non-Final Office Action—U.S. Appl. No. 15/287,054.
May 16, 2017—(US) Notice of Allowance—U.S. Appl. No. 14/706,368.
Jun. 1, 2017—(US) Notice of Allowance—U.S. Appl. No. 13/834,434.
Jun. 1, 2017—(US) Notice of Allowance—U.S. Appl. No. 15/283,829.
Mar. 6, 2018—(JP) Notification of Rejection—App 2017-000214—Eng Tran.
Oct. 17, 2017—(US) Non-final Office Action—U.S. Appl. No. 15/691,214.
Nov. 24, 2017—(US) Notice of Allowance—U.S. Appl. No. 14/669,553.
Jan. 30, 2018—(US) Final Office Action—U.S. Appl. No. 14/498,213.
Mar. 20, 2018—(JP) Notification of Rejection—App 2014-113107—Eng Tran.
Mar. 30, 2018—(US) Non-Final Office Action—U.S. Appl. No. 15/584,056.
Apr. 2, 2018—(US) Final Office Action—U.S. Appl. No. 15/691,214.
Apr. 28, 2018—(CN) First Office Action—App 201610330026.1, Eng Tran.
Jun. 6, 2018—U.S. Notice of Allowance—U.S. Appl. No. 14/669,553.
Jun. 15, 2018—U.S. Notice of Allowance—U.S. Appl. No. 14/498,213.
Jul. 10, 2018—(JP) Notification of Reasons for Rejection—App 2017-157066—Eng Tran.

* cited by examiner

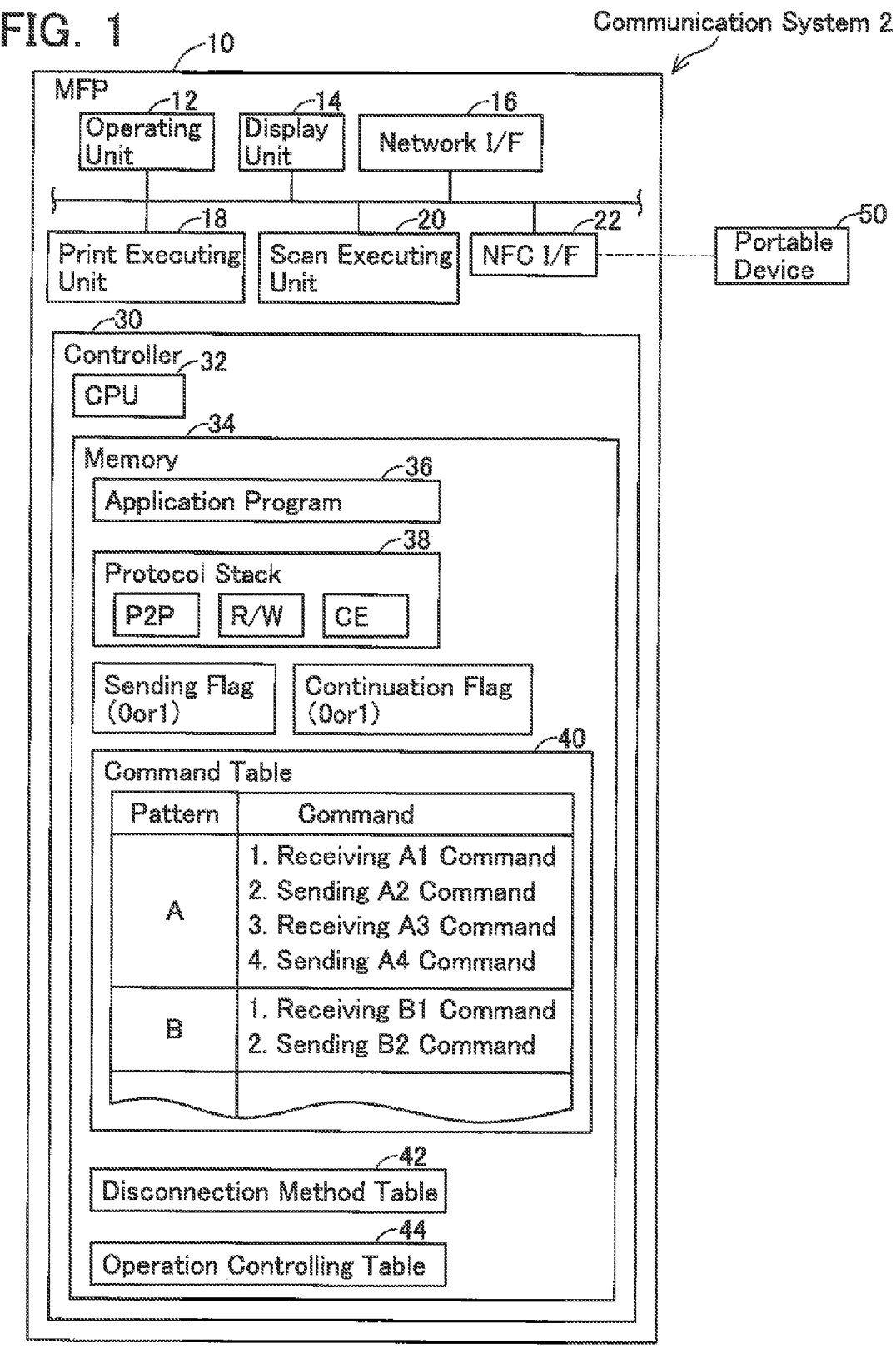

FIG. 2

Disconnection Method Table 42

| Situation | OS Information Type | OS Information Ver. | Mode P2P | Mode Reader | Mode Writer | Mode CE |
|---|---|---|---|---|---|---|
| Poll Cont. | T1 | V1 | First Hard Disconnection ·RF OFF→200ms →RF ON | First Soft Disconnection ·Deactivation Sending→ Receiving OK | First Soft Disconnection ·Deactivation Sending→ Receiving OK | — |
| | T1 | V2 | First Soft Disconnection ·Deactivation Sending→ Receiving OK | First Soft Disconnection ·Deactivation Sending→ Receiving OK | First Soft Disconnection ·Deactivation Sending→ Receiving OK | — |
| | T2 | V3 | Soft + Hard Disconnection ·Deactivation Sending→ Receiving OK →RF OFF→10ms →RF ON | First Soft Disconnection ·Deactivation Sending→ Receiving OK | First Soft Disconnection ·Deactivation Sending→ Receiving OK | — |
| Listen Cont. | T1 | V1 | First Hard Disconnection ·RF OFF→200ms →RF ON | — | — | Second Soft Disconnection ·Deactivation Receiving→ Sending OK |
| | T1 | V2 | Second Hard Disconnection ·RF OFF→300ms →RF ON | — | — | Second Soft Disconnection ·Deactivation Receiving→ Sending OK |
| | T2 | V3 | Second Hard Disconnection ·RF OFF→300ms →RF ON | — | — | Second Soft Disconnection ·Deactivation Receiving→ Sending OK |
| Poll End | any | | First Soft Disconnection ·Deactivation Sending→ Receiving OK | First Soft Disconnection ·Deactivation Sending→ Receiving OK | First Soft Disconnection ·Deactivation Sending→ Receiving OK | — |
| Listen End | any | | Second Soft Disconnection ·Deactivation Receiving→ Sending OK | — | — | Second Soft Disconnection ·Deactivation Receiving→ Sending OK |

FIG. 3

Operation Controlling Table 44

| Situation | OS Information Type | Ver. | Mode P2P | Reader | Writer | CE |
|---|---|---|---|---|---|---|
| Poll Cont. | T1 | V1 | — | First Hard Controlling ·RF OFF→200ms →RF ON | First Hard Controlling ·RF OFF→200ms →RF ON | — |
| | | V2 | — | — | — | — |
| | T2 | V3 | — | Second Hard Controlling ·RF OFF→300ms →RF ON | Second Hard Controlling ·RF OFF→300ms →RF ON | — |
| Listen Cont. | T1 | V1 | — | — | — | First Hard Controlling ·RF OFF→200ms →RF ON |
| | | V2 | — | — | — | Second Hard Controlling ·RF OFF→300ms →RF ON |
| | T2 | V3 | — | — | — | Second Hard Controlling ·RF OFF→300ms →RF ON |
| Poll End | any | | — | — | — | — |
| Listen End | any | | — | — | — | — |

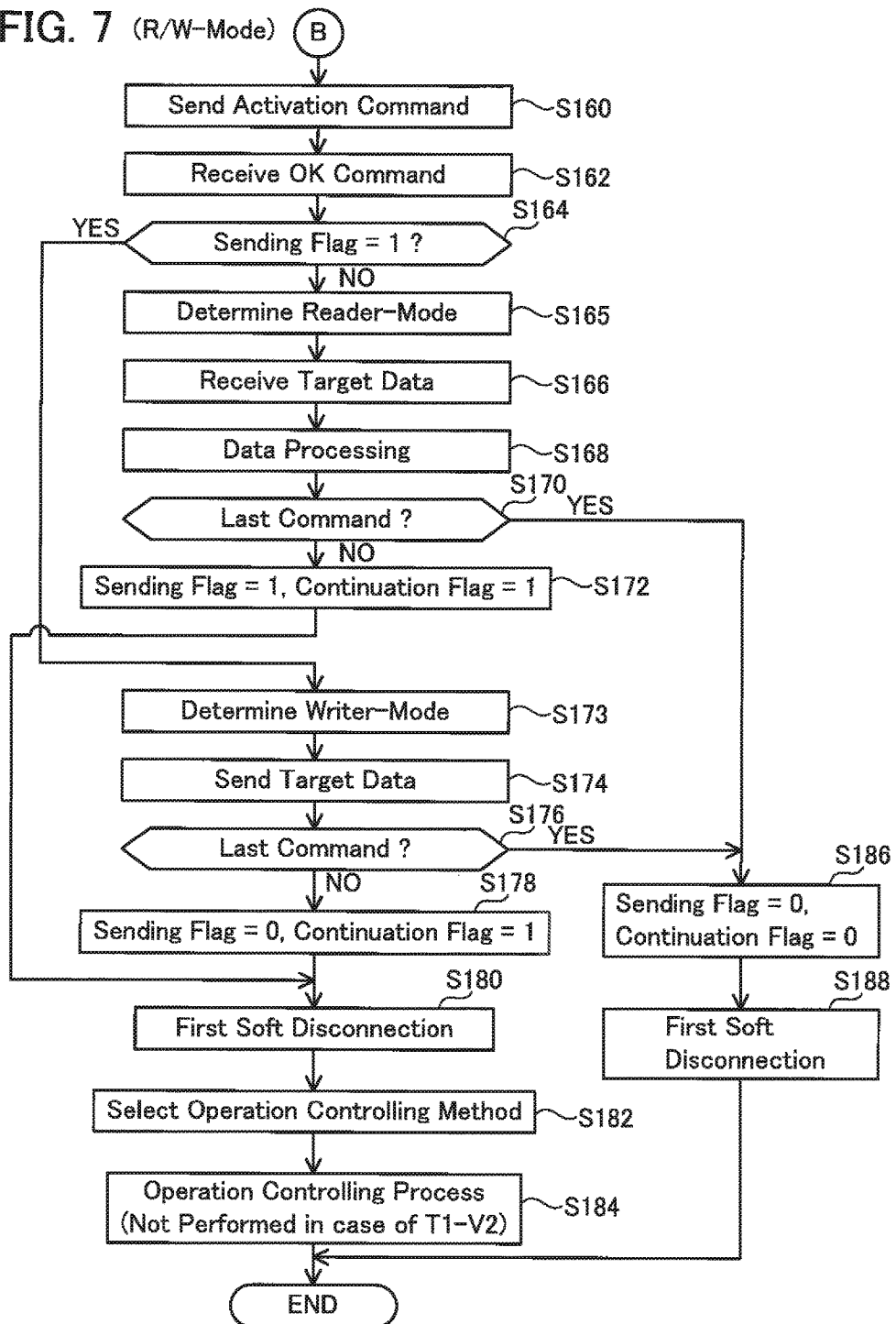

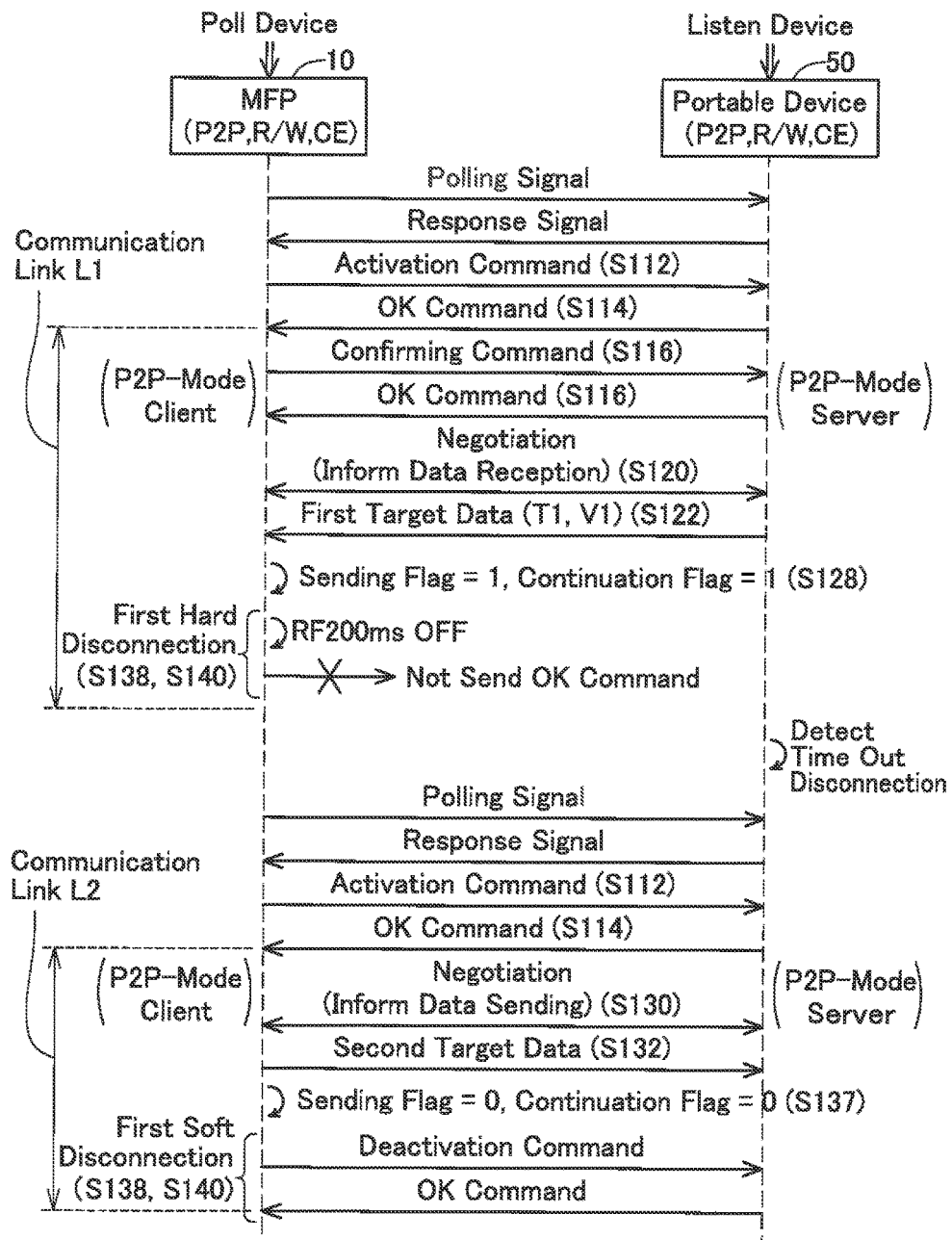

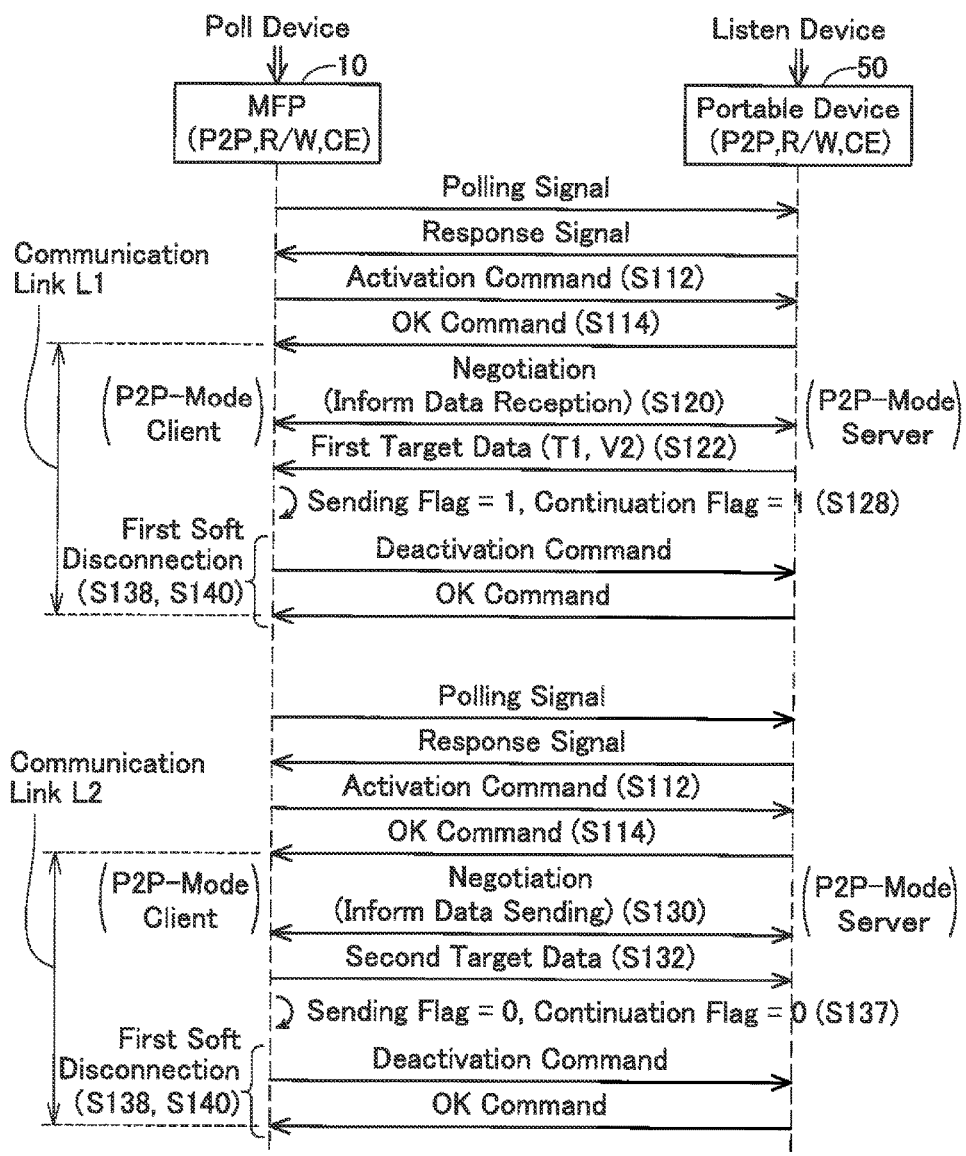

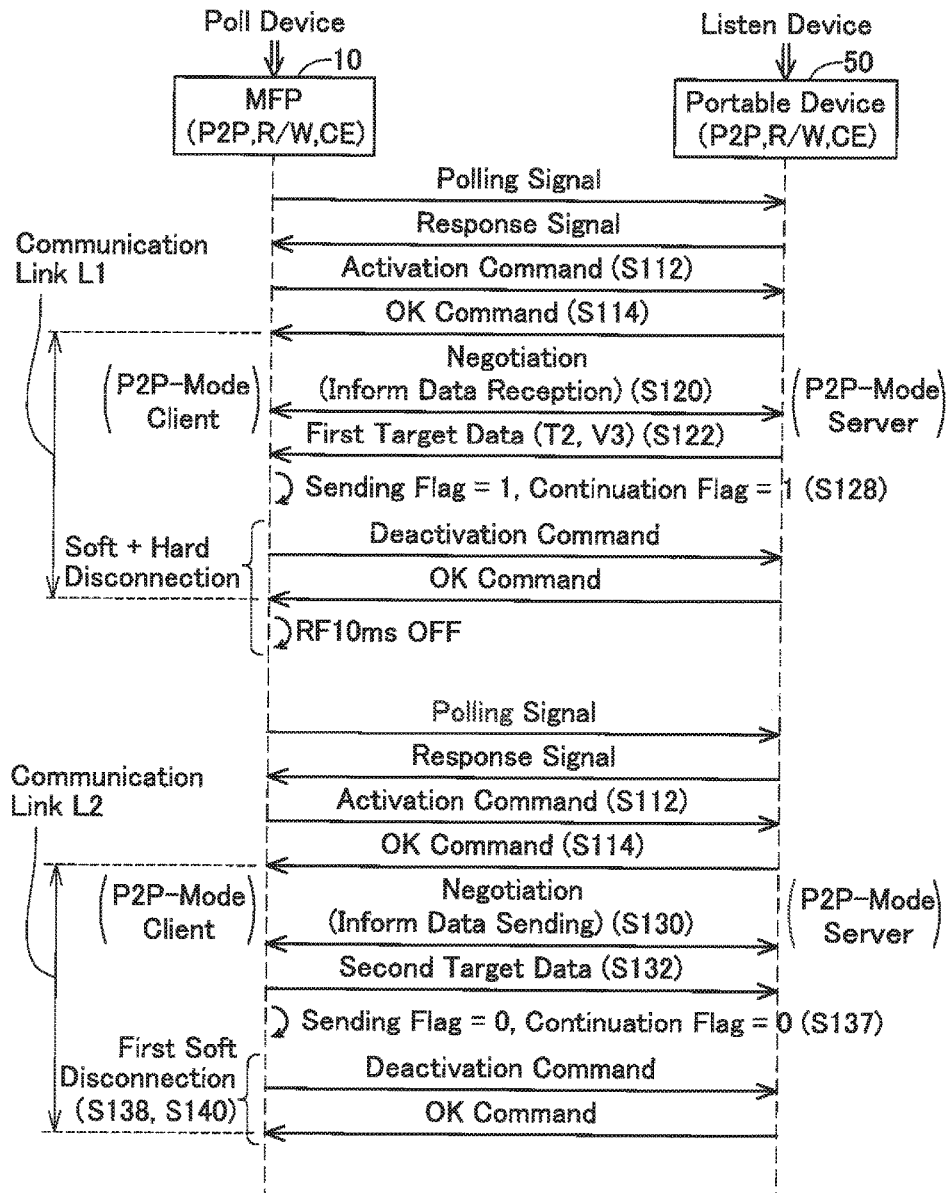
FIG. 10 (Case C)

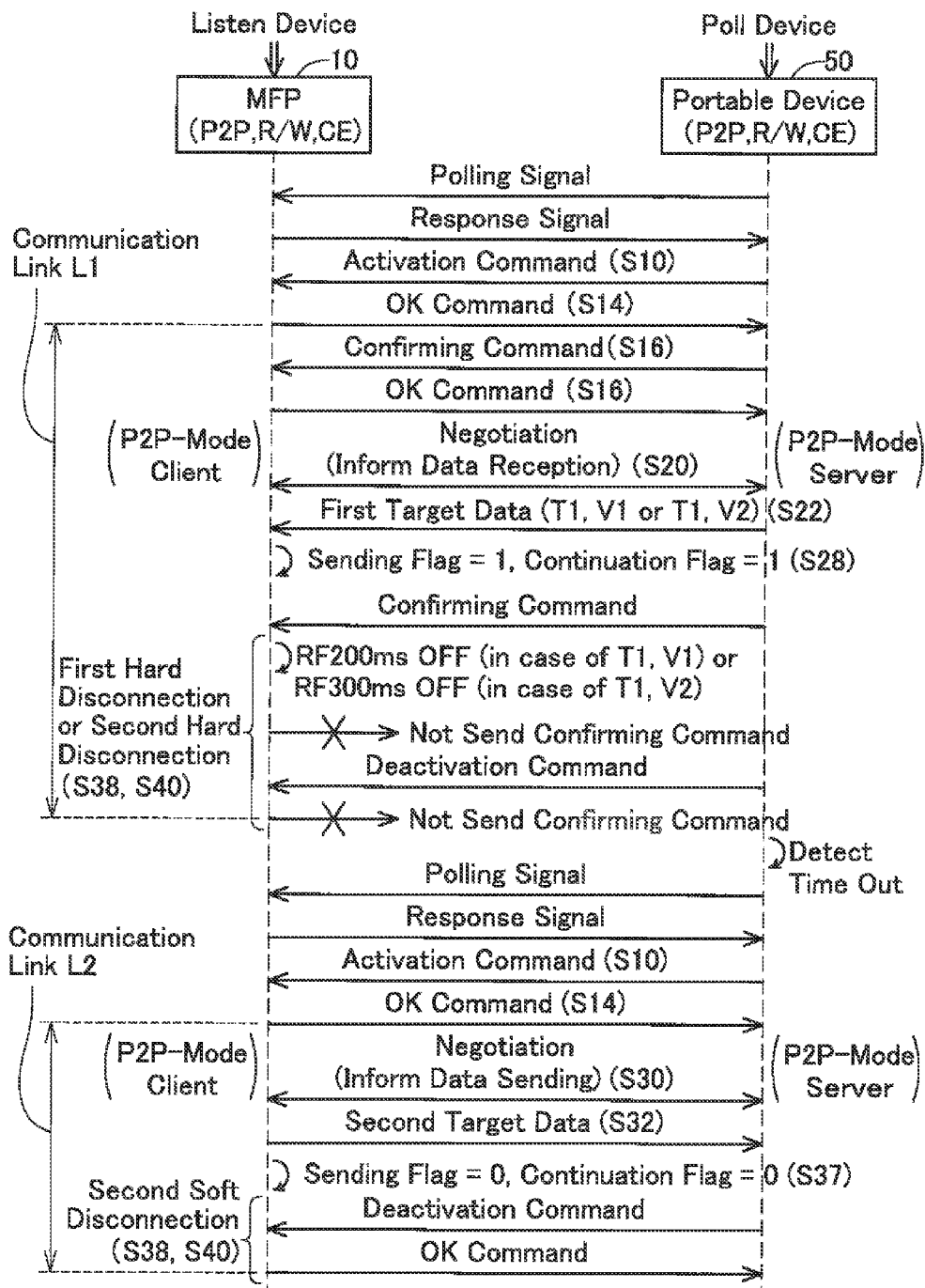

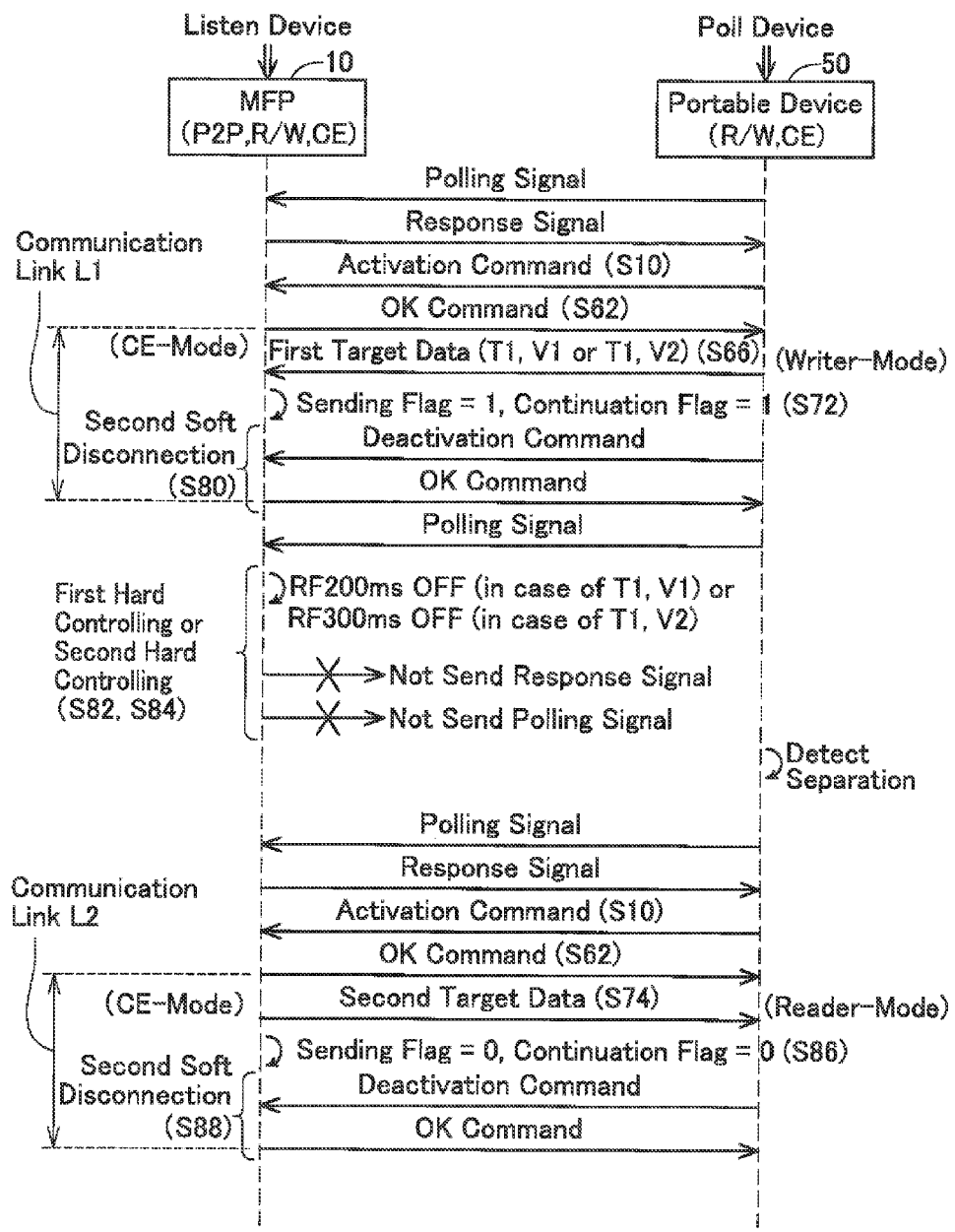

COMMUNICATION DEVICE COMMUNICATING TARGET DATA WITH EXTERNAL DEVICE ACCORDING TO NEAR FIELD COMMUNICATION

CROSS-REFERENCE TO RELATED APPLICATIONS

This application is a Continuation of U.S. patent application Ser. No. 15/162,995 filed May 24, 2016, which is a Continuation of U.S. patent application Ser. No. 14/663,923 filed Mar. 20, 2015, issued as U.S. Pat. No. 9,354,835 on May 31, 2016, which is a Continuation of U.S. patent application Ser. No. 13/933,419 filed Jul. 2, 2013, issued as U.S. Pat. No. 8,994,996 on Mar. 31, 2015, which claims priority to Japanese Patent Application No. 2012-149050, filed on Jul. 3, 2012, the contents of which are hereby incorporated by reference into the present application.

TECHNICAL FIELD

The technology disclosed in the present specification relates to a communication device that communicates target data that is a target of communication, with an external device according to an NFC (an abbreviation of Near Field Communication) scheme, which is a communication scheme complying with an NFC standard.

DESCRIPTION OF RELATED ART

A technique for executing wireless communication by two communication devices is known. In this technology, the two communication devices communicate communication information wirelessly according to the NFC scheme. The communication information includes information used for executing the wireless communication according to a communication scheme (such as IEEE 802.11a) different from the NFC scheme (i.e., information indicating the communication scheme, information indicating an encryption scheme). With this technology, the two communication devices can execute the wireless communication in accordance with the communication scheme different from the NFC scheme.

SUMMARY

The present specification provides a technology for allowing a communication device to appropriately communicate target data that is a target of communication, with an external device according to the NFC scheme.

One aspect of the technique disclosed in the present specification may be a communication device configured to communicate target data with an external device according to an NFC (an abbreviation of Near Field Communication) scheme complying with an NFC standard. The communication device may comprise: an NFC interface configured to execute a communication under the NFC scheme; a processor; and a memory configured to store computer executable instructions. The computer executable instructions may cause the processor to execute: a first establishing step for communicating a first establishing command with the external device via the NFC interface so as to establish a first communication link between the communication device and the external device; a receiving step for receiving first target data from the external device via the NFC interface by using the first communication link, the first target data including a specific command and related information which is related to a communication program for the external device executing a communication of the NFC scheme; a creating step for processing the specific command included in the first target data so as to create second target data; a selecting step for selecting one type of disconnection method according to the related information included in the first target data from among plural types of disconnection methods for disconnecting the first communication link; a disconnecting step for disconnecting the first communication link by using the selected one type of disconnection method; a second establishing step for communicating a second establishing command with the external device via the NFC interface after the first communication link has been disconnected, so as to establish a second communication link between the communication device and the external device; and a sending step for sending the second target data to the external device via the NFC interface by using the second communication link.

Note that a controlling method, computer executable instructions, and a non-transitory computer readable medium for storing the computer executable instructions which are for realizing the communication device described above are newly useful. A communication system including the communication device and the external device is also newly useful.

BRIEF DESCRIPTION OF THE DRAWINGS

FIG. 1 shows a configuration of a communication system.

FIG. 2 shows an example of a disconnection method table.

FIG. 3 shows an example of an operation controlling table.

FIG. 7 shows a flowchart following FIG. 6.

FIG. 8 shows a sequence chart of communication in a case A.

FIG. 9 shows a sequence chart of communication in a case B.

FIG. 10 shows a sequence chart of communication in a case C.

FIG. 11 shows a sequence chart of communication in a case D.

FIG. 12 shows a sequence chart of communication in a case E.

EMBODIMENT (Configuration of Communication System 2)

Figure 4:
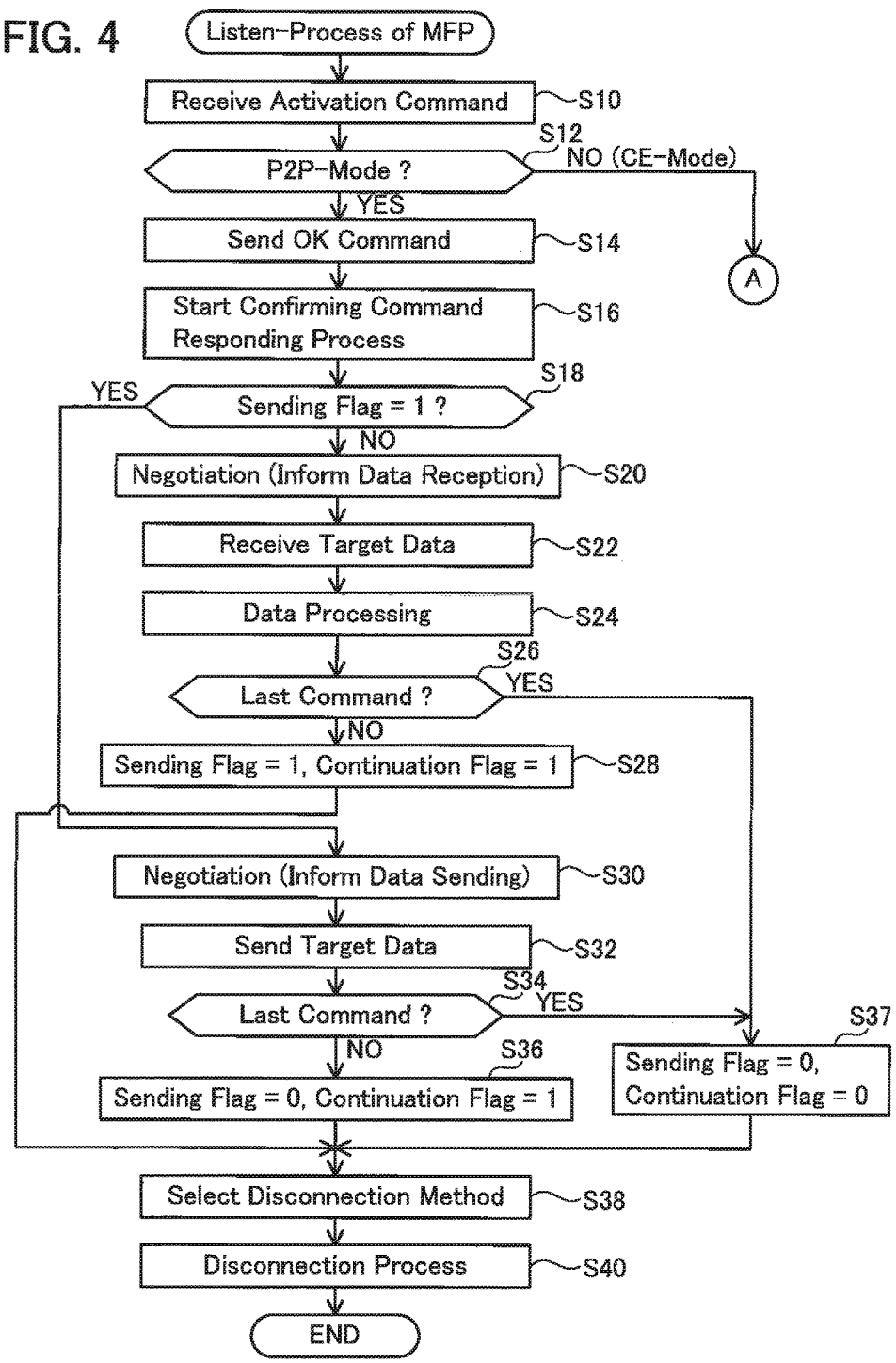
FIG. 4 shows a flowchart of a Listen-process of MFP.

As shown in FIG. 1, a communication system 2 has a multi-function peripheral ("MFP," hereinafter) 10 and a portable device 50. The MFP 10 and the portable device 50 are capable of executing communication in accordance with a communication scheme (i.e., an NFC scheme) complying with the NFC standard. In the present embodiment, the NFC standard is ISO/IEC 21481 or ISO/IEC 18092 international standard level. The NFC scheme communication is wireless communication using a radio wave of 13.56 MHz band. The MFP 10 and the portable device 50 are each capable of executing wire communication or wireless communication by using a communication network different from a communication link according to the NFC scheme.

(Configuration of MFP 10)

The MFP 10 has an operating unit 12, a display unit 14, a network interface (described as "I/F," hereinafter) 16, a print executing unit 18, a scan executing unit 20, an NFC I/F 22, and a controller 30.

The operating unit 12 has a plurality of keys. A user can input various instructions to the MFP 10 by operating the operating unit 12. The display unit 14 is a display for displaying various pieces of information. The network I/F 16 may be an I/F connected to a wired network or an I/F connected to a wireless network. Note that this wireless network is a network for executing wireless communication different from the NFC scheme communication, the network complying with, for example, an IEEE (an abbreviation of Institute of Electrical and Electronics Engineers, Inc.) 802.11 standard and a standard equivalent thereto (e.g., 802.11a, 11b, 11g, 11n). The print executing unit 18 is an inkjet or laser printing mechanism. The scan executing unit 20 is a scan mechanism such as a CCD or CIS.

The NFC I/F 22 is an interface for executing the NFC scheme communication. The NFC I/F 22 is configured by a chip different from the network I/F 16. Note that, in a case where the network I/F 16 is an I/F connected to a wireless network, the network I/F 16 and the NFC I/F 22 differ from each other in terms of the following points.

In other words, the speed of wireless communication using the network I/F 16 is higher than the speed of wireless communication using the NFC I/F 22. The frequency of a carrier wave in the wireless communication performed using the network I/F 16 is different from the frequency of a carrier wave in the wireless communication performed using the NFC I/F 22. When the distance between the MFP 10 and the portable device 50 is approximately 10 cm or less, the MFP 10 can execute the NFC scheme communication with the portable device 50 using the NFC I/F 22. On the other hand, even when the distance between the MFP 10 and the portable device 50 is equal to or greater than 10 cm, or equal to or less than 10 cm, the MFP 10 can execute the wireless communication with the portable device 50 using the network I/F 16. In other words, the maximum distance in which the MFP 10 can execute the wireless communication with a communication-destination device (e.g., the portable device 50) via the network I/F 16 is greater than the maximum distance in which the MFP 10 can execute the wireless communication with the communication-destination device via the NFC I/F 22. It should be noted that the wireless communication using the network I/F 16 is referred to as "network wireless communication" hereinafter.

The controller 30 has a CPU 32 and a memory 34. The CPU 32 executes various processes in accordance with programs 36, 38 stored in the memory 34. The memory 34 is configured by a ROM, a RAM, a hard disk, and the like. The memory 34 stores therein the programs 36, 38 that are executed by the CPU 32.

The application program 36 is a program executed by the CPU 32 to process an application layer of the OSI reference model. The protocol stack 38 is a program executed by the CPU 32 to process a layer lower than the application layer of the OSI reference model. Note that the protocol stack 38 includes a P2P (an abbreviation of Peer to Peer) program, a R/W program, and a CE program. The P2P program is a program for executing a process according to a P2P-mode of the NFC standard. The R/W program is a program for executing a process according to a Reader/Writer-mode of the NFC standard. The CE program is a program for executing a process according to a CE (an abbreviation of Card Emulation) mode of the NFC standard. These programs are used for executing processes complying with the NFC standards defined by the NFC forum.

The memory 34 also stores a sending flag, a continuation flag, a command table 40, a disconnection method table 42, and an operation controlling table 44.

The sending flag indicates whether or not the MFP 10 is to send the target data that is a target of communication by using the NFC scheme communication. Specifically, in a situation in which the MFP 10 is to send the target data, the sending flag is set at "1." In a situation in which the MFP 10 is not to send the target data, the sending flag is set at "0."

The continuation flag indicates whether the communication (sending or receiving) of the target data is to be continued. Though described hereinafter in detail, one or more target data values are sequentially communicated between the MFP 10 and the portable device 50. For instance, after the first target data is sent from the portable device 50 to the MFP 10, the second target data is sent from the MFP 10 to the portable device 50. This series of communications may be ended in this manner In this example, because the stage where the first target data is communicated is a situation in which the second target data is to be communicated subsequently, the continuation flag is set at "1." Furthermore, because the stage where the second target data is communicated is a situation where the target data is not to be communicated subsequently or, in other words, a situation in which the communications of all target data values are ended, the continuation flag is set at "0."

The command table 40 shows each command that can be included in each target data value that is to be sent or received by the MFP 10 using the NFC scheme communication. For example, as shown in a pattern A, when receiving an A1 command (more precisely, one target data value including the A1 command), the MFP 10 sends an A2 command, then receives an A3 command, and then sends an A4 command. Since this command table 40 is stored in the memory 34, the controller 30 can find out that one target data value including the A2 command is to be sent when one target data value including the A1 command is received. The controller 30 can also find out that the A4 command is the last command, or that a series of communications of a plurality of target data values is ended, when, for example, one target data value including the A4 command is sent.

Note in the present embodiment that the series of communications of a plurality of target data values is based on the assumption that the MFP 10 receives the initial target data instead of sending the initial target data. Therefore, the command table 40 describes that the MFP 10 receives the initial command (i.e., A1, B1).

(Contents of Disconnection Method Table 42; FIG. 2)

As shown in FIG. 2, the disconnection method table 42 has the following columns: "situation," "OS information," "mode," and "disconnection method" associated with one another. Though described hereinafter in detail, the MFP 10 refers to the disconnection method table 42 to select a disconnection method for disconnecting an NFC scheme communication link (see S38 and the like of FIG. 4).

The column "situation" shows a situation in which the NFC scheme communication link is to be disconnected, and is classified into "Poll continuation," "Listen continuation," "Poll end," and "Listen end." The Poll continuation indicates a situation in which when the MFP 10, the Poll device described hereinafter, executes communication of target data, communication of the subsequent target data follows. The Listen continuation indicates a situation in which when the MFP 10, the Listen device as described hereinafter, executes communication of target data, communication of the subsequent target data follows. The Poll end indicates a situation in which when the MFP 10, the Poll device, executes communication of target data, communication of the subsequent target data is not to follow. The Listen end indicates a situation in which when the MFP 10, the Listen device, executes communication of target data, communication of the subsequent target data is not to follow.

The column "OS information" shows a combination of type information indicating the type of an OS (Operating System) program and version information indicating the version of the OS program. Type information T1 is, for example, Android™, and type information T2 is, for example, Windows 8™. Version information V1, V2 indicate the information on the version of the OS program specified by the type information T1 (e.g., Android™). The version information V1 is newer than the version information V2. For example, the version information V1 indicates version 4.0.0 of Android™ or a newer version. The version information V2 indicates version 2.3.4 of Android™. Version information V3 indicates the information on the version of the OS program specified by the type information T2 (e.g., Windows 8™). The version information V3 indicates, for example, version SP1 of Windows 8™. Note that the term "any" described in the column "OS information" means any OS information, or means that any disconnection method can be selected regardless of the OS information.

The column "mode" shows a mode complying with the NFC standard and is classified into "P2P-mode," "Reader-mode," "Writer-mode," and "CE-mode." Note that the devices capable of executing the NFC scheme communication (the MFP 10, the portable device 50, etc.) are referred to as "NFC devices," hereinafter. In addition, the Reader-mode and the Writer-mode are simply described as "R/W-mode," hereinafter.

Among the NFC devices, there exists a device capable of using all of the three modes, the P2P-mode, the R/W-mode, and the CE-mode, as well as a device capable of using one or two of the three modes. In the present embodiment, the MFP 10 is the device capable of using all of the three modes. On the other hand, the portable device 50 may be capable of using all of the three modes or two of the three modes such as the R/W-mode and the CE-mode.

The P2P-mode is a mode for executing bidirectional communication between a pair of NFC devices. For example, a situation is simulated in which a first NFC device and a second NFC device are operated according to the P2P-mode. In this case, a communication link for executing communication according to the P2P-mode is established between the first NFC device and the second NFC device. For instance, the first NFC device sends first target data to the second NFC device by using the communication link. Subsequently, the second NFC device normally sends second target data to the first NFC device by using the same communication link. In this manner, the bidirectional communication is realized. While an NFC device, a tag type of which defined by the NFC forum is type A of ISO/IEC 1443, and an NFC device of tag type F of ISO/IEC 18092, can be operated according to the P2P-mode, an NFC device of tag type B of ISO/IEC 1443 cannot be operated according to the P2P-mode.

The R/W-mode and the CE-mode are modes for executing unidirectional communication between a pair of NFC devices. The CE-mode is a mode in which each of the NFC devices is operated as a "card," a format defined by the NFC forum. The NFC device of the type A, the NFC device of the type F, and the NFC device of the type B can be operated according to the CE-mode The Reader-mode is a mode for reading data from the NFC devices operated as the cards in the CE-mode. The Writer-mode is a mode for writing data into the NFC devices operated as the cards in the CE-mode. Note that, in the Reader-mode, the data can be read from a card complying with the NFC standard. Moreover, in the Writer-mode, data can be written into the card complying with the NFC standard.

For example, a situation is simulated in which the first NFC device is operated according to the Reader-mode and the second NFC device is operated according to the CE-mode. In this case, a communication link for executing communication according to the Reader-mode and the CE-mode is established between the first NFC device and the second NFC device. The first NFC device executes an operation for reading target data from a pseudo card of the second NFC device, and thereby receives the target data from the second NFC device.

For example, a situation is simulated in which the first NFC device is operated according to the Writer-mode and the second NFC device is operated according to the CE-mode. In this case, a communication link for executing communication according to the Writer-mode and the CE-mode is established between the first NFC device and the second NFC device. The first NFC device executes an operation for writing target data in a pseudo card of the second NFC device, and thereby sends the target data to the second NFC device.

As described above, various combinations of the modes can be considered in order for a pair of NFC devices to execute the NFC scheme communication. For example, the following five patterns can be considered as a combination of the modes of the MFP 10 and the portable device 50: "P2P-mode, P2P-mode," "Reader-mode, CE-mode," "Writer-mode, CE-mode," "CE-mode, Reader-mode," and "CE-mode, Writer-mode."

The column "disconnection method" shows methods for disconnecting the NCF scheme communication link and is classified into first hard disconnection, second hard disconnection, first soft disconnection, second soft disconnection, and soft+hard disconnection. Note in the disconnection method table 42 that the sections without disconnection methods each correspond to an unlikely combination of "situation" and "mode." For example, an after-mentioned Poll device is not likely to be operated according to the CE-mode. Therefore, no disconnection methods are described in the columns corresponding to "Poll continuation" or "Poll end" and "CE."

The first hard disconnection is a method for disconnecting the communication link by stopping an operation of an NFC I/F 22 for 200 ms. Specifically, in the first hard disconnection, for example, the controller 30 sends to the NFC I/F 22 an instruction for stopping the operations of the NFC I/F 22. Consequently, the NFC I/F 22 temporarily stops all of the operations including receiving/sending signals from/to the outside, a Poll-operation described hereinafter, and a Listen-operation described hereinafter. After waiting 200 ms, the controller 30 sends to the NFC I/F 22 an instruction for restarting the operations of the NFC I/F 22. Consequently, the NFC I/F 22 restarts the operations. As a result, the operations of the NFC I/F 22 can be stopped for 200 ms. After restarting the operations, the NFC I/F 22 returns to the state in which the NFC I/F 22 can execute the Poll-operation and the Listen-operation, which are described hereinafter.

Note that the first hard disconnection is not limited to the abovementioned method for sending these stopping and restarting instructions to the NFC I/F 22. For instance, the controller 30 may stop supplying power to the NFC I/F 22 for 200 ms. This method, too, can stop the operations of the NFC I/F 22 for 200 ms. The second hard disconnection, soft+hard disconnection, first hard controlling (see FIG. 3), and second hard controlling (see FIG. 3) may also be the methods for sending these stopping and restarting instructions to the NFC I/F 22 or the methods for stopping supplying power to the NFC I/F 22.

The second hard disconnection is a method for disconnecting the communication link by stopping an operation of the NFC I/F 22 for 300 ms. The second hard disconnection is the same as the first hard disconnection, except that the length of time for which the operations of the NFC I/F 22 are stopped (300 ms) is different from that of the first hard disconnection (200 ms).

The first soft disconnection is a method for disconnecting the communication link by sending a Deactivation command to disconnect the communication link and receiving an OK command The second soft disconnection is a method for disconnecting the communication link by receiving the Deactivation command and sending an OK command The soft+hard disconnection is a method for disconnecting the communication link by sending the Deactivation command, receiving an OK command, and then stopping the operations of the NFC I/F 22 for 10 ms.

The first soft disconnection and the second soft disconnection are general disconnection methods defined by the NFC forum. Thus, the general NFC devices normally use the first and second soft disconnection methods to disconnect the communication links. On the other hand, the first hard disconnection, the second hard disconnection, and the soft+hard disconnection are not the general disconnection methods but disconnection methods unique to the MFP 10 according to the present embodiment. Though described hereinafter in detail, the MFP 10 refers to the disconnection method table 42 to select a disconnection method according to "situation," "OS information," and "mode" from among plural types of disconnection methods (five types of disconnection methods in the present embodiment), to disconnect the communication link. The reason that the disconnection method selected according to "situation" and the like changes is described hereinafter in detail (described with specific cases shown in FIGS. 8 to 12).

(Contents of Operation Controlling Table 44; FIG. 3)

As shown in FIG. 3, the operation controlling table 44 has the following columns: "situation," "OS information," "mode," and "operation controlling method" associated with one another. The meanings of "situation," "OS information" and "mode" are as described above. The column "operation controlling method" is a method for controlling the operations of the NFC I/F 22 after the communication link is disconnected, and is classified into first hard controlling and second hard controlling. Note in the operation controlling table 44 that the sections without the operation controlling methods indicate that the operations of the NFC I/F 22 are not controlled after the communication link is disconnected.

The first hard controlling is a method for controlling the operations of the NFC I/F 22 by stopping an operation of the NFC I/F 22 for 200 ms, as with the first hard disconnection shown in FIG. 2. The second hard controlling is a method for controlling the operations of the NFC I/F 22 by stopping an operation of the NFC I/F 22 for 300 ms, as with the second hard disconnection shown in FIG. 2.

The general NFC devices normally do not execute the first and second hard controlling. In other words, the first and second hard controlling methods are unique to the MFP 10 of the present embodiment. The reason for executing the first and second hard controlling is described hereinafter in detail (described with the flowcharts shown in FIGS. 5 and 7).

(Configuration of Portable Device 50)

The portable device 50 is, for example, a cellular phone (e.g., a smartphone), a PDA, a laptop, a tablet PC, a portable music reproducer, a portable video reproducer, or the like. The portable device 50 has the network I/F for connecting to the wireless network and the NFC I/F. The portable device 50 is capable of executing the wireless communication with the MFP 10 via either the network I/F or the NFC I/F.

The portable device 50 has an application program ("MFP application," hereinafter) for causing the MFP 10 to execute various functions (e.g., a printing function, a scanning function, etc.). Note that the MFP application may be installed on the portable device 50 from, for example, a server provided by a vendor of the MFP 10 or installed on the portable device 50 from a medium shipped along with the MFP 10.

(Target Data to be Communicated)

Next are described examples of the target data to be communicated in the NFC scheme communication executed between the MFP 10 and the portable device 50.

(First Example)

A situation is simulated in which the MFP 10 is to receive print data from the portable device 50 to execute the printing function according to the print data. The user of the portable device 50 activates the MFP application of the portable device 50 and inputs to the portable device 50 an instruction for causing the MFP 10 to execute the printing function. In this case, the portable device 50 uses the NFC scheme communication to send first target data including a print execution instruction to the MFP 10. The first target data does not include the print data.

The MFP 10 receives the first target data from the portable device 50 via the NFC I/F 22. As mentioned above, the speed of the NFC scheme communication is lower than the speed of the network wireless communication. For this reason, if the NFC scheme communication is used for communicating the print data from the portable device 50 to the MFP 10, it might take a long time to communicate the print data. The present example, therefore, adopts a configuration in which the MFP 10 receives the print data from the portable device 50 by using the network wireless communication. In order to adopt such a configuration, the portable device 50 needs to know wireless settings for executing the network wireless communication with the MFP 10. Thus, when receiving the first target data including the print execution instruction from the portable device 50, the MFP 10 sends to the portable device 50 via the NFC I/F 22 second target data including the wireless settings and an instruction command for instructing the portable device 50 to use the wireless settings.

In this manner, the MFP 10 and the portable device 50 can communicate the print data by executing the network wireless communication in place of the NFC scheme communication. As a result, the MFP 10 can execute the printing function.

(Second Example)

A situation is simulated in which the MFP 10 is to execute the scanning function of scanning and generating scan data to send the scan data to the portable device 50. The user of the portable device 50 activates the MFP application of the portable device 50 and inputs to the portable device 50 an instruction for causing the MFP 10 to execute the scanning function. In this case, the portable device 50 uses the NFC scheme communication to send first target data including a scan execution instruction to the MFP 10.

The MFP 10 receives the first target data from the portable device 50 via the NFC I/F 22. Similarly to the first example mentioned above, if the NFC scheme communication is used for communicating the print data from the MFP 10 to the portable device 50, it might take a long time to communicate the scan data. The present example, therefore, adopts a configuration in which the MFP 10 sends the scan data to the portable device 50 by using the network wireless communication. Thus, when receiving the first data including the scan execution instruction from the portable device 50, the MFP 10 sends to the portable device 50 via the NFC I/F 22 second data including the wireless settings and an instruction command for instructing the portable device 50 to use the wireless settings.

In this manner, the MFP 10 and the portable device 50 can communicate the scan data by executing the network wireless communication in place of the NFC scheme communication. As a result, the MFP 10 can execute the scanning function.

(Third Example)

A situation is simulated in which the portable device 50 is to send, to the MFP 10, setting information to be used by the MFP 10. Examples of the setting information include print setting information used when the MFP 10 executes the printing function (e.g., print resolution, paper size, etc.), scan setting information used when the MFP 10 executes the scanning function (e.g., scanning resolution, etc.), and communication setting information used when the MFP 10 executes a communication function (e.g., an IP address, subnet mask, gateway address, etc.).

The user of the portable device 50 activates the MFP application of the portable device 50 and inputs to the portable device 50 the setting information to be used by the MFP 10. In this case, the portable device 50 sends to the MFP 10 by using the NFC scheme communication first target data including the setting information and a command for causing the portable device 50 to set the setting information.

The MFP 10 receives the first target data from the portable device 50 via the NFC I/F 22. The MFP 10 stores the setting information included in the first target data in the memory 34 as the setting information to be used by the MFP 10. Consequently, the MFP 10 can execute various functions by using the setting information. When receiving the first target data from the portable device 50, the MFP 10 sends to the portable device 50 via the NFC I/F 22 second target data including a response command indicating the receipt of the first target data.

(Fourth Example)

A situation is simulated in which the portable device 50 is to send, to the MFP 10, address information included in an address book that is currently used. The user of the portable device 50 activates the MFP application of the portable device 50 and inputs to the portable device 50 an instruction for sending the address information to the MFP 10. In this case, the portable device 50 sends to the MFP 10 by using the NFC scheme communication first target data including the address information and a command for causing the portable device 50 to set the address information.

The MFP 10 receives the first target data from the portable device 50 via the NFC I/F 22. The MFP 10 adds the address information included in the first target data to the address book currently used in the MFP 10 (i.e., the address book within the memory 34). Consequently, the MFP 10 can execute the communication function by using the received address information. When receiving the first target data from the portable device 50, the MFP 10 sends to the portable device 50 via the NFC I/F 22 second target data including a response indicating the receipt of the first target data.

(Fifth Example)

The first example described above adopts a configuration in which the MFP 10 sends the print data to the portable device 50 by using the network wireless communication. Instead, for example, the MFP 10 may receive first target data including the print data and the print executing command from the portable device 50 via the NFC I/F 22. In this case, the MFP 10 may send to the portable device 50 via the NFC I/F 22 second target data including a response command indicating the receipt of the first target data.

Although various examples of the target data have been described above, the combinations of the "first target data" and "second target data" are not limited to the ones described in the first to fifth examples; thus, other combinations can be formed as well. In other words, the "first target data" may be any type of data as long as it is received by the MFP 10 using the NFC scheme communication. The "second target data" may be any type of data as long as the data (i.e., data different from the first target data) is created by processing a command included in the first target data.

Note in the first to fifth examples that the series of communications of a plurality of target data values is ended by allowing the MFP 10 to receive the first target data and send the second target data. Therefore, in the first to fifth examples, as shown in, for example, the pattern B in the command table 40 of FIG. 1, the command included in the first target data corresponds to "B1 command," and the command included in the second target data to "B2 command." When communications of these two commands are ended, the series of communications of the plurality of target data values is ended.

However, as shown in the pattern A of the command table 40 of FIG. 1, three or more target data values can be communicated. In the third example, for instance, the MFP 10 may (1) receive the first target data including part of the setting information and a setting command (e.g., "A1 command") from the portable device 50, (2) send the second target data including a response command (e.g., "A2 command") to the portable device 50, (3) receive the third target data including the rest of the setting information and a setting command (e.g., "A3 command") from the portable device 50, and (4) send the fourth target data including a response command (e.g., "A4 command") to the portable device 50.

(Poll-Operation and Listen-Operation)

Next, the Poll-operation and the Listen-operation executed by the NFC device will be explained. In the MFP 10, for example, instead of causing the CPU 32 to execute the Poll-operation and the Listen-operation in accordance with the programs 36, 38, the NFC I/F 22 executes the Poll-operation and the Listen-operation. The Poll-operation is an operation for sending a polling signal and receiving a response signal responsive to the polling signal. The Listen-operation is an operation for receiving a polling signal and sending a response signal responsive to the polling signal.

The NFC I/F 22 of the MFP 10 is capable of being operated in any of the following modes: a Poll-mode for executing the Poll-operation, a Listen-mode for executing the Listen-operation, and a mode for executing neither the Poll-operation nor the Listen-operation (referred to as "no-execution mode," hereinafter). The NFC I/F 22 is operated in the Poll-mode, the Listen-mode, and the no-execution mode sequentially. For example, the NFC I/F 22 executes one set of operations in which the operations are performed in the Poll-mode, subsequently in the Listen-mode, and then in the no-execution mode. The NFC I/F 22 repeatedly executes this one set of operations.

In the Poll-mode, the NFC I/F 22 sends a polling signal and monitors receipt of a response signal. Specifically, the NFC I/F 22 (1) sends a polling signal to which the NFC device of the type A can respond (i.e., a polling signal corresponding to the type A), and monitors receipt of a response signal for a predetermined period of time. (2) When not receiving the response signal, the NFC I/F 22 sends a polling signal to which the NFC device of the type B can respond (i.e., a polling signal corresponding to the type B), and monitors receipt of a response signal for a predetermined period of time. (3) When not receiving the response signal, the NFC I/F 22 sends a polling signal to which the NFC device of the type F can respond (i.e., a polling signal corresponding to the type F), and monitors receipt of a response signal for a predetermined period of time. The NFC I/F 22 repeats these operations. When the NFC I/F 22 receives the response signal from any of the NFC devices within a predetermined period of time, this NFC device is considered the type of NFC device corresponding to the polling signal that is received immediately before the response signal is sent. When receiving the response signal, the NFC I/F 22 further sends an inquiry signal to the NFC device to inquire in which mode the NFC device, to which the response signal is sent, can be operated. As a result, the NFC I/F 22 receives an operable mode signal from this NFC device. The operable mode signal indicates that the NFC device can be operated in the P2P-mode and the CE-mode or that the NFC device can be operated only in the CE-mode.

In the Listen-mode, the NFC I/F 22 monitors receipt of a polling signal, and, when receiving the polling signal, sends a response signal. Only when receiving the type of polling signal corresponding to the NFC I/F 22, the NFC I/F 22 sends a response signal to the NFC device that had sent the polling signal. When sending the response signal to the NFC device, the NFC I/F 22 receives the inquiry signal from the NFC device and sends the operable mode signal to the NFC device.

In the no-execution mode, the NFC I/F 22 does not send a polling signal, and does not send a response signal even when a polling signal is received.

The portable device 50 also repeatedly executes the one set of operations described above. Therefore, when, for example, the distance between the MFP 10 and the portable device 50 is less than 10 cm and a period during which the NFC I/F 22 is operated in the Poll-mode is equivalent to a period during which the portable device 50 is operated in the Listen-mode, the NFC I/F 22 executes the Poll-operation of sending a polling signal to the portable device 50 and receiving a response signal from the portable device 50. Furthermore, when, for example, the distance between the MFP 10 and the portable device 50 is less than 10 cm and a period during which the NFC I/F 22 is operated in the Listen-mode is equivalent to a period during which the portable device 50 is operated in the Poll-mode, the NFC I/F 22 executes the Listen-operation of receiving a polling signal from the portable device 50 and sending a response signal to the portable device 50.

The NFC device executing the Poll-operation (referred to as "Poll device," hereinafter) can be operated in the P2P-mode or the R/W-mode in accordance with the NFC standard but cannot be operated in the CE-mode. Therefore, when the MFP 10 is the Poll device, the CPU 32 determines that the MFP 10 is to be operated in the P2P-mode or the R/W-mode. In addition, the NFC device executing the Listen-operation (referred to as "Listen device," hereinafter) can be operated in the PSP-mode or the CE-mode in accordance with the NFC standard but cannot be operated in the R/W-mode. Therefore, when the MFP 10 is the Listen device, the CPU 32 determines that the MFP 10 is to be operated in the P2P-mode or the CE-mode, as described above.

When the NFC I/F 22 executes the Poll-operation, each of the processes required for performing the subsequent communication is taken over by the CPU 32. Specifically, information indicating the operation of a certain mode executed by the portable device 50 (i.e., information indicated by a receipt complete operable mode signal), is delivered from the NFC I/F 22 to the CPU 32. Based on the information delivered from the NFC I/F 22, the CPU 32 determines in which mode the MFP 10 is to be operated. For example, in a case where the MFP 10 can be operated in any of the modes and the receipt complete operable mode signal indicates the operability in the P2P-mode and the CE-mode, the CPU 32 determines that the MFP 10 is to be operated in the P2P-mode. In this case, the CPU 32 sends an Activation command corresponding to the P2P-mode to the portable device 50 (S112 of FIG. 6). The Activation command is a command adopted according to the NFC standard and is used for establishing a communication link according to the NFC scheme between the MFP 10 and the portable device 50. For example, in a case where the MFP 10 can be operated in any of the modes and the receipt complete operable mode signal indicate the operability in the CE-mode, the CPU 32 determines that the MFP 10 is to be operated in the R/W-mode. In this case, the CPU 32 sends the Activation command corresponding to the R/W-mode to the portable device 50 (S160 of FIG. 7).

Also, when the NFC I/F 22 executes the Listen-operation, each of the processes required for performing the subsequent communication is taken over by the CPU 32. Specifically, the CPU 32 receives the Activation command from the portable device 50, the Activation command corresponding to the mode in which the portable device 50 is to be operated (see S10 in FIG. 4). When receiving the Activation command corresponding to the P2P-mode, the CPU 32 determines that the MFP 10 is to be operated in the P2P-mode. When receiving the Activation command corresponding to the R/W-mode, the CPU 32 determines that the MFP 10 is to be operated in the CE-mode.

As long as the NFC I/F 22 executes the Poll-operation or the Listen-operation as described above, the CPU 32 can find out not only that the portable device 50 exists in the vicinity of the MFP 10, but also that in which mode the MFP 10 is to be operated. The CPU 32 then executes each of the processes required for performing the subsequent communication (see FIGS. 4 to 7 described hereinafter).

(Processes Executed by MFP 10; FIGS. 4 to 7)

Processes executed by the MFP 10 are described next with reference to FIGS. 4 to 7. Note that the CPU 32 executes each of the processes shown in FIGS. 4 to 7 in accordance with the programs 36, 38 stored in the memory 34. First of all, contents of processes that are executed by the CPU 32 when the NFC I/F 22 executes the Listen-operation (FIGS. 4 and 5; referred to as "Listen-process of MFP," hereinafter) are described, and then contents of processes that are executed by the CPU 32 when the NFC I/F 22 executes the Poll-operation (FIGS. 6 and 7; referred to as "Poll-process of the MFP," hereinafter) are described.

Note that the application program 36 includes a code for using an API of a protocol stack to instruct the CPU 32 to start the Listen-process according to a protocol stack 38. In a state in which the CPU 32 is operated according to the application program 36, the CPU 32 starts the Listen-process according to the protocol stack 38 upon receipt of the instruction for starting the Listen-process according to the protocol stack 38. The application program 36 also includes a code for using an API of the protocol stack 38 to instruct the CPU 32 to start the Poll-process according to the protocol stack 38. In a state in which the CPU 32 is operated according to the application program 36, the CPU 32 starts the Poll-process according to the protocol stack 38 upon receipt of the instruction for starting the Poll-process according to the protocol stack 38.

Figure 5:
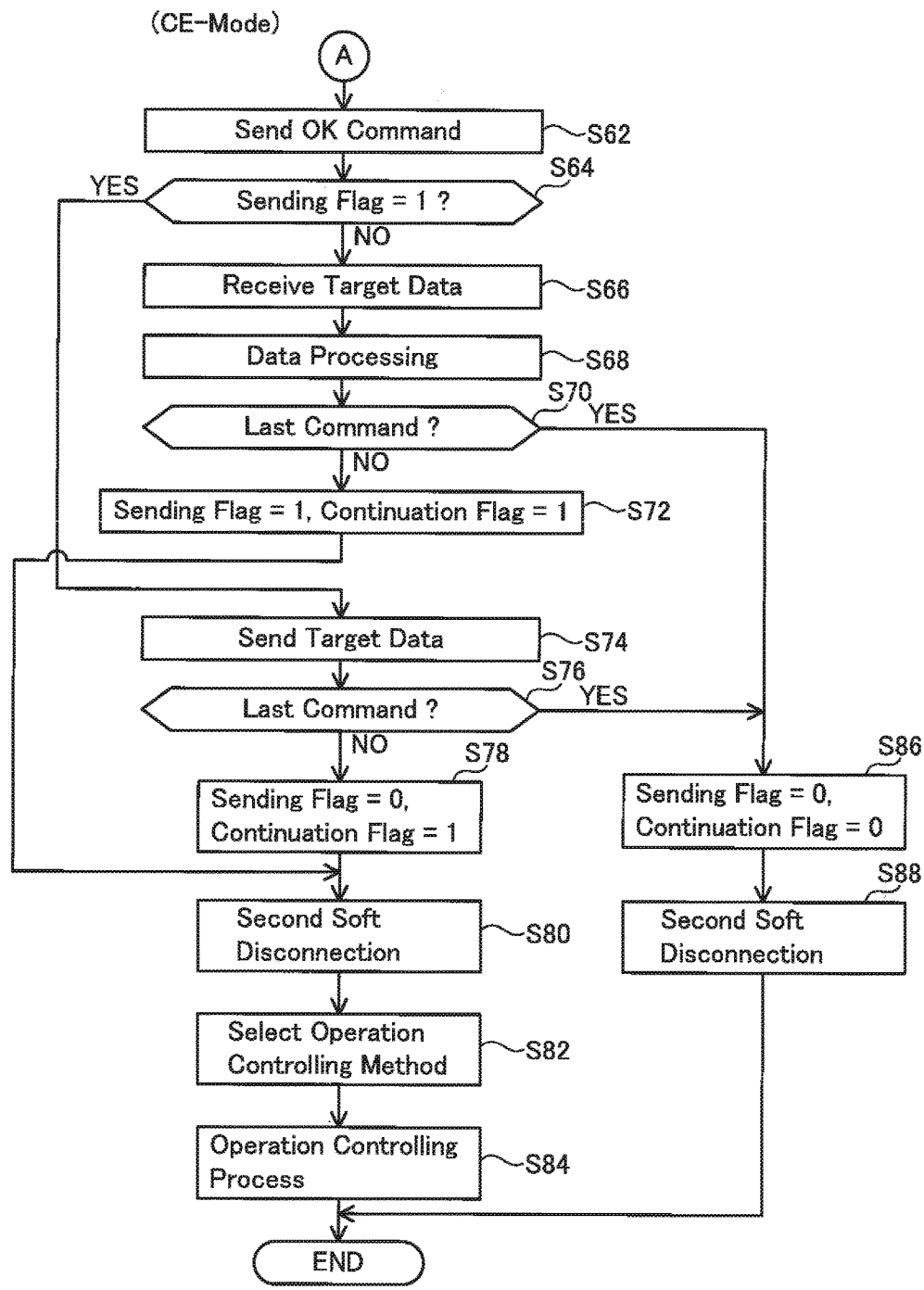
FIG. 5 shows a flowchart following FIG. 4.

(Listen-Process of MFP; FIGS. 4 and 5)

As described above, in a case where the NFC I/F 22 executes the Listen-operation (i.e., the portable device 50 executes the Poll-operation), the portable device 50 sends the activation command to the MFP 10. The activation command corresponds to the mode in which the portable device 50 is to be operated. In S10, the CPU 32 receives the activation command from the portable device 50 via the NFC I/F 22.

Next, in S12 the CPU 32 determines whether the MFP 10 is to be operated in the P2P-mode or the CE-mode. When receiving the Activation command corresponding to the P2P-mode, the CPU 32 determines that the MFP 10 is to be operated in the P2P-mode (YES in S12) and proceeds to S14. On the other hand, when receiving the Activation command corresponding to the R/W-mode, the CPU 32 determines that the MFP 10 is to be operated in the CE-mode (NO in S12) and proceeds to S62 shown in FIG. 5. It is unlikely that the CPU 32 receives the Activation command corresponding to the CE-mode. This is because the Poll device (i.e., the portable device 50) can be operated in the P2P-mode or the R/W-mode but cannot be operated in the CE-mode, as described above.

(Listen-Process of MFP; P2P-Mode)

In S14, the CPU 32 sends a response command (i.e., an OK command) to the portable device 50 via the NFC I/F 22 responsive to the activation command. Consequently, the communication link according to the NFC scheme is established between the MFP 10 and the portable device 50. In other words, the CPU 32 can appropriately establish the communication link by receiving the activation command and sending the OK command Note that, in the Listen-process of MFP, the activation command cannot be sent from the MFP 10 to the portable device 50. This is because the Poll device (i.e., the portable device 50) can send the activation command, but the Listen device (i.e., the MFP 50) cannot send the activation command.

Next, in S16, the CPU 32 starts a confirming command responding process. A confirming command is sent from the Poll device to the Listen device to confirm whether or not to maintain the communication link. As described above, the MFP 10 is the Listen device and the portable device 50 the Poll device at the present moment. Thus, in the confirming command responding process, the CPU 32 receives the confirming command from the portable device 50 via the NFC I/F 22 and sends a response command (i.e., an OK command) to the portable device 50 via the NFC I/F 22 responsive to the confirming command Although not shown in the flowcharts, once the CPU 32 starts the confirming command responding process in S16, the CPU 32 continues the execution of the confirming command responding process until S40 described hereinafter is executed. Note that the CPU 32 executes the processes of S10 to S16 in accordance with the protocol stack 38.

The protocol stack 38 includes a code for instructing the CPU 32 to output data indicating creation of a confirming command receiving event. Once receiving the initial confirming command in S16, the CPU 32 outputs the data indicating creation of a confirming command receiving event. The application program 36 includes a code for instructing the CPU 32 to execute S18 when the data indicating creation of a confirming command receiving event is output. Therefore, once receiving the initial confirming command in S16, the CPU 32 executes S18 in accordance with the application program 36.

In S18, the CPU 32 determines whether the sending flag in the memory 34 is "1" or not. The sending flag is set at "0" or "1" in S28, S36, or S37 which are described hereinafter. When the sending flag in the memory 34 is "1," the CPU 32 determines that the result of S18 is YES, and proceeds to S30. On the other hand, when the sending flag stored in the memory 34 is "0," the CPU 32 determines that the result of S18 is NO, and proceeds to S20. Note that when the result of S18 is YES or NO, the CPU 32 uses the API of the protocol stack 38 to set data indicating that the MFP 10 is operated as a client to perform communication according to a SNEP (short for "Simple NDEF Exchange Protocol"). NDEF is short for "NFC Data Exchange Format." The protocol stack 38 includes a code for instructing the CPU 32 to execute negotiation to operate the MFP 10 as a client according to the setting generated using the API. Therefore, once S18 is ended, the CPU 32 executes the process of S20 or S30 according to the protocol stack 38.

In S20, the CPU 32 executes negotiation with the portable device 50 via the NFC I/F 22. Specifically, the CPU 32 first determines that the MFP 10 is operated as a client of the SNEP. The CPU 32 then executes communication according to the SNEP in such a manner that the MFP 10 is operated as a client and the portable device 50 as a server of the SNEP. Consequently, the portable device 50 is operated as a server executing processes, in response to a request from the client (i.e., the MFP 10).

In S20, the CPU 32 further informs the portable device 50 of that the MFP 10 executes data reception (i.e., that the portable device 50 executes data sending). This allows the portable device 50 to know that the target data is to be sent to the MFP 10, and sends the target data to the MFP 10.

Next, in S22, the CPU 32 receives the target data from the portable device 50 via the NFC I/F 22 according to the protocol stack 38 by using the communication link established in S14. The target data received in S22 includes a command to be processed by the CPU 32. For example, in the first, second and fifth examples described above, the first target data received in S22 includes a print execution command or scan execution command. In the third or fourth example, the first target data received in S22 includes a setting command. The target data received in S22 also includes the OS information related to the OS program mounted in the portable device 50. The OS information includes the type information (e.g., "T1") indicating the type of the OS program, and the version information (e.g., "V1") indicating the version of the OS program.

The protocol stack 38 includes a code for instructing the CPU 32 to output data indicating creation of a target data receiving event. Once receiving the target data in S22, the CPU 32 outputs the data indicating creation of a target data receiving event. The application program 36 includes a code for instructing the CPU 32 to execute S24, when the data indicating creation of a target data receiving event is output from the protocol stack 38. Thus, once receiving the target data in S22, the CPU 32 executes S24 according to the application program 36.

In S24, the CPU 32 processes the target data received in S22, in accordance with the application program 36. For instance, in the first or second example described above, the CPU 32 creates second target data that includes wireless settings and an instruction command for instructing the portable device 50 to use the wireless settings, in accordance with the print execution command or scan execution command that are included in the first target data received in S22. Additionally, in the third example described above, for instance, the CPU 32 stores, in the memory 34, the setting information included in the first target data, and creates second target data that includes a response command indicating the receipt of the setting information, in accordance with the setting command that is included in the first target data received in S22. Also, in the fourth example described above, for instance, the CPU 32 adds, to an address book of the memory 34, address information included in the first target data, and creates second target data that includes a response command indicating the receipt of the address information, in accordance with the setting command that is included in the first target data received in S22. Moreover, in the fifth example described above, for instance, the CPU 32 uses print data included in the first target data, to execute the printing function in accordance with the print execution command that is included in the first target data received in S22, and creates second target data that includes a response command indicating the receipt of the print data.

Subsequently, in S26 the CPU 32 refers to the command table 40 of the memory 34 to determine whether the command included in the target data received in S22 is the last command or not, in accordance with the application program 36. When the command included in the target data received in S22 is the "A1 command," "B1 command," or "B3 command" stored in the command table 40, it means that the communication of the "A2 command" or the like is to be executed subsequently, and, therefore, the CPU 32 determines that the command included in the target data received in S22 is not the last command (NO in S26), and proceeds to S28.

In S28, the CPU 32 sets the sending flag in the memory 34 at "1" and sets the continuation flag in the memory 34 at "1," in accordance with the application program 36. Because the sending flag is set at "1," the CPU 32 can send the target data to the portable device 50 when the subsequent communication link is established. Furthermore, because the continuation flag is set at "1," the CPU 32 can find out in S38, described hereinafter, that the current situation of the MFP 10 indicates "Listen continuation." Once S28 is ended, the CPU 32 proceeds to S38.

When, on the other hand, the CPU 32 determines that the command included in the target data received in S22 is the last command (YES in S26), the CPU 32 proceeds to S37. In S37, the CPU 32 sets the sending flag in the memory 34 at "0" and sets the continuation flag in the memory 34 at "0," in accordance with the application program 36. Because the sending flag is set at "0," the CPU 32 can receive the target data from the portable device 50 when the subsequent communication link is established. Also, because the continuation flag is set at "0," the CPU 32 can find out in S38, described hereinafter, that the current situation of the MFP 10 indicates "Listen end." Once S37 is ended, the CPU 32 proceeds to S38.

When the result of S18 is YES (i.e., when the sending flag is "1"), in S30 the CPU 32 executes the negotiation, as with S20, in accordance with the protocol stack 38, in such a manner that the MFP 10 is operated as a client of the P2P-mode and the portable device 50 as a server of the P2P-mode. In S30, the CPU 32 also informs the portable device 50 of that the MFP 10 executes data sending (i.e., that the portable device 50 executes data reception). Consequently, the portable device 50 waits until receiving the target data from the MFP 10.

Figure 6:
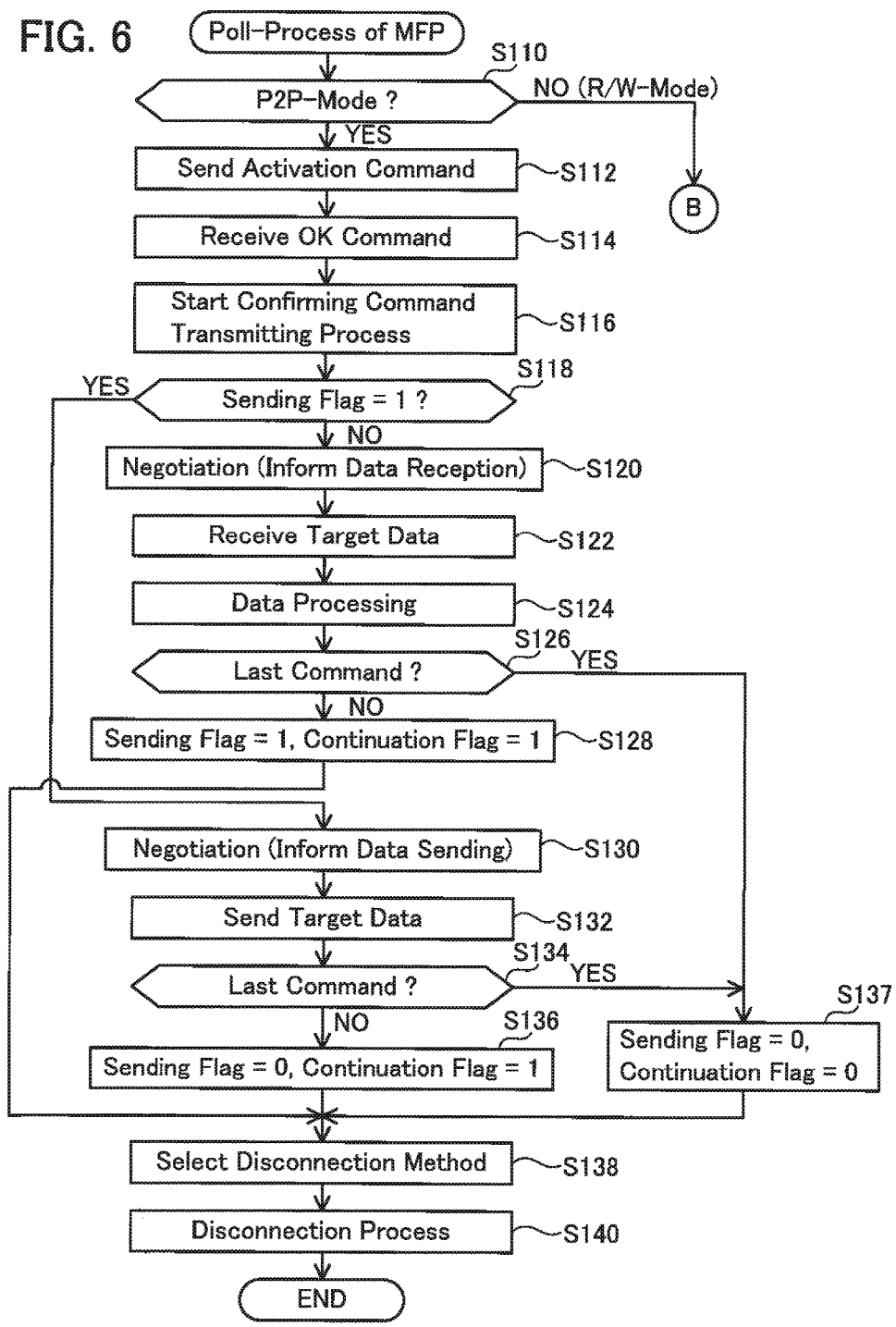
FIG. 6 shows a flow chart of a Poll-process of the MFP.

Next, in S32 the CPU 32 sends the target data to the portable device 50 via the NFC I/F 22 by using the API of the protocol stack 38 and the communication link established in S14, in accordance with the application program 36. For example, in the first to fifth examples described above, the CPU 32 processes the command included in the first target data to create the second target data in, for example, S24 of the previous Listen-process of MFP or S124 of the previous Poll-process of MFP (FIG. 6). In this case, in S32 the CPU 32 sends the created second target data to the portable device 50.

Next, in S34 the CPU 32 refers to the command table 40 in the memory 34 to determine, in accordance with the application program 36, whether the command that is included in the target data sent in S32 is the last command or not. When, for example, the command that is included in the target data sent in S32 is the "A2 command" in the command table 40, it means that the communication of the "A3 command" or the like is executed subsequently, and, therefore, the CPU 32 determines that the command that is included in the target data received in S32 is not the last command (NO in S34), and proceeds to S36. In S36, the CPU 32 sets the sending flag in the memory 34 at "0" and sets the continuation flag in the memory 34 at "1," in accordance with the application program 36. Once S36 is ended, the CPU 32 proceeds to S38.

On the other hand, when, for example, the command that is included in the target data received in S32 is the "B2 command" stored in the command table 40, the CPU 32 determines that the command that is included in the target data received in S32 is the last command ("YES in S34), and proceeds to S37. In S37, the CPU 32 sets the sending flag in the memory 34 at "0" and sets the continuation flag in the memory 34 at "0," in accordance with the application program 36. Once S37 is ended, the CPU 32 proceeds to S38.

In S38, the CPU 32 refers to the disconnection method table 42 in the memory 34, the value of the continuation flag in the memory 34, and the OS information of the portable device 50, and selects, from among the plural types of disconnection methods, a disconnection method for disconnecting the communication link established in S14, in accordance with the application program 36. Because the MFP 10 is the Listen device at the stage of S38, the current situation of the MFP 10 indicates "Listen continuation" or "Listen end." When the continuation flag is "1," the current situation of the MFP 10 indicates "Listen continuation." When the continuation flag is "0," the current situation of the MFP 10 indicates "Listen end." At the stage of S38, the MFP 10 is in the P2P-mode.

For instance, when S38 is executed after S22, the target data received in S22 includes the OS information of the portable device 50. In S38, therefore, the CPU 32 selects a disconnection method by using the OS information of the portable device 50 that is included in the target data received in S22.

Moreover, for example, when S38 is executed after S32, although S22 is not executed, in the series of communications of a plurality of target data values according to the present embodiment, the MFP 10 receives the initial target data from the portable device 50 instead of sending the initial target data to the portable device 50. Thus, in a case where S32 is executed, the CPU 32 receives the target data from the portable device 50, when the communication link prior to the communication link established in S14 is established. In S38, therefore, the CPU 32 selects a disconnection method by using the OS information of the portable device 50 that is included in the target data (i.e., the previous target data received from the portable device 50).

For example, when the current situation of the MFP 10 indicates "Listen continuation," in S38 the CPU 32 selects a disconnection method according to the OS information of the portable device 50. Specifically, when the OS information of the portable device 50 includes "T1" and "V1," the CPU 32 selects the first hard disconnection. When the OS information of the portable device 50 includes "T1" and "V2," the CPU 32 selects the second hard disconnection. When the OS information of the portable device 50 includes "T2" and "V3," the CPU 32 selects the second hard disconnection (see FIG. 2). On the other hand, when, for example, the current situation of the MFP 10 indicates "Listen end," in S38 the CPU 32 selects the second soft disconnection, regardless of the OS information of the portable device 50 (see "any" in FIG. 2).

Next, in S40, the CPU 32 disconnects the communication link established in S14 by using the disconnection method selected in S38. For instance, when the disconnection method selected in S38 is the second soft disconnection, in S40 the CPU 32 first ends the confirming command responding process of S16 by using the API of the protocol stack 38 in accordance with the application program 36. In other words, even when the CPU 32 receives the confirming command from the portable device 50, the CPU 32 no longer sends a response command (i.e., an OK command) responsive to the confirming command, to the portable device 50. Consequently, the portable device 50 can find out that the MFP 10 does not wish to maintain the communication link, and sends to the MFP 10 the Deactivation command for disconnecting the communication link. As a result, the CPU 32 receives the Deactivation command from the portable device 50 via the NFC I/F 22 in accordance with the protocol stack 38. In this case, the CPU 32 sends a response command (i.e., an OK command) responsive to the Deactivation command to the portable device 50 via the NFC I/F 22 in accordance with the protocol stack 38. As a result, the communication link established in S14 is disconnected.

Note that the Deactivation command cannot be sent from the MFP 10 to the portable device 50 in the Listen-process of MFP. This is because while the Poll device (i.e., the portable device 50) can send the Deactivation command, the Listen device (i.e., the MFP 10) cannot send the Deactivation command On the other hand, when, for example, the disconnection method selected in S38 is the first hard disconnection, in S40 the CPU 32 disconnects the power of the NFC I/F 22 for 200 ms and then connects the power again. As a result, the operations of the NFC I/F 22 are temporarily stopped for 200 ms. When, for example, the disconnection method selected in S38 is the second hard disconnection, in S40 the CPU 32 disconnects the power of the NFC I/F 22 for 300 ms and then connects the power again. Consequently, the operations of the NFC I/F 22 are temporarily stopped for 300 ms. As a result, the NFC I/F 22 temporarily stops all of the operations including receiving/sending signals from/to the outside, the Poll-operation, and the Listen-operation. Thus, the CPU 32 can no longer execute the confirming command responding process that is started in S16, via the NFC I/F 22.

Note that, when the disconnection method selected in S38 is the first or second hard disconnection, in S40 the CPU 32 may input the abovementioned stopping instruction to the NFC I/F 22, end the operation of the CPU 32 in accordance with the protocol stack 38, thereafter input the abovementioned restarting instruction to the NFC I/F 22, and restart the operation of the CPU 32 in accordance with the protocol stack 38. In this case as well, the operations of the NFC I/F 22 (all of the operations including receiving/sending signals from/to the outside, the Poll-operation, and the Listen-operation) can temporarily be stopped.

Once the first or second hard disconnection is executed, the portable device 50 cannot receive a response command (i.e., an OK command) responsive to the confirming command, as with the case of the second soft disconnection. In this case, the portable device 50 sends the Deactivation command to the MFP 10 to disconnect the communication link but cannot receive a response command (i.e., an OK command) responsive to the Deactivation command because the operations of the NFC I/F 22 of the MFP 10 are stopped. The portable device 50, therefore, determines this situation as a timeout and ends the process for maintaining the communication link (i.e., the process for sending the confirming command, etc.). As a result, the communication link established in S14 is disconnected. Once S40 is ended, the Listen-process of MFP is ended.

Although not shown in the disconnection method table 42 of FIG. 2 and the flowchart of FIG. 4, when the OS information of the portable device 50 includes type information different from "T1" and "T2" (e.g., "T3" indicating iOS), the CPU 32 may execute two-way communication of a plurality of target data values by using the same communication link without executing S38 and S40 (e.g., without disconnecting the communication link).

(Listen-Process of MFP; CE-Mode (FIG. 5))

Contents of processes that are executed when the result of S12 of FIG. 4 is determined as NO (when it is determined that the MFP 10 is to be operated in the CE-mode) are described next with reference to FIG. 5. The step S62 is the same as S14 shown in FIG. 4. Note that, when the MFP 10 is operated in the CE-mode and the portable device 50 is operated in the R/W-mode, the confirming command responding process (see S16 of FIG. 4) is not executed, unlike the case of the P2P-mode. This is because it is not necessary to confirm whether to maintain the communication link or not, since this mode is for one-way communication (i.e., the mode in which the target data is communicated only once).

Note that S62 is executed according to the protocol stack 38. In addition, S64, S68, S70, S72, S76, S78, S82, and S86 are executed according to the application program 36. Also, S66, S74, S80, S84, and S88 are executed using the API of the protocol stack 38 in accordance with the application program 36.

The steps S64 to S72 are the same as S18 and S22 to S28 shown in FIG. 4. The steps S74 to S78 are the same as S32 to S36 shown in FIG. 4. Subsequent to S72 or S78, the Listen-process of MFP proceeds to S80. When the result of S70 or S76 is YES, the Listen-process of MFP proceeds to S86. The step S86 is the same as the step S37 shown in FIG. 4. Once S86 is ended, the Listen-process of MFP proceeds to S88.

In S80 or S88, the CPU 32 first refers to the disconnection method table 42 to select a disconnection method for disconnecting the communication link established in S62. At the stage of S80 or S88, the current situation of the MFP 10 indicates "Listen continuation" or "Listen end," and the MFP 10 is in the CE-mode. Therefore, the CPU 32 selects the second soft disconnection, regardless of the OS information of the portable device 50 (see FIG. 2). In S80 or S88, the CPU 32 uses the selected second soft disconnection to disconnect the communication link established in S62. The details of the second soft disconnection are as described above. When ending S80, the Listen-process of MFP is ended after S82 and S84 are executed. When S88 is ended, on the other hand, the Listen-process of MFP is ended without having S82 and S84 executed.

In S82, the CPU 32 refers to the operation controlling table 44 in the memory 34 and the OS information of the portable device 50, to select one operation controlling method from among the plural types of operation controlling methods. In S82, the CPU 32 selects an operation controlling method according to the OS information of the portable device 50. For instance, when S82 is executed after S66, in S82 the CPU 32 selects an operation controlling method by using the OS information of the portable device 50 that is included in the target data received in S66. When, for example, S82 is executed after S74, in S82 the CPU 32 selects an operation controlling method by using the OS information of the portable device 50 that is included in the previous target data received from the portable device 50. Specifically, when the OS information of the portable device 50 includes "T1" and "V1," the CPU 32 selects the first hard controlling. When the OS information of the portable device 50 includes "T1" and "V2," the CPU 32 selects the second hard controlling. When the OS information of the portable device 50 includes "T2" and "V3," the CPU 32 selects second hard controlling (see FIG. 3).

In S84, the CPU 32 executes an operation controlling process by using the operation controlling method selected in S82. For example, when the operation controlling method selected in S82 is the first hard controlling, in S84 the CPU 32 temporarily stops the operations of the NFC I/F 22 for 200 ms. When, for example, the operation controlling method selected in S82 is the second hard controlling, in S84 the CPU 32 temporarily stops the operations of the NFC I/F 22 for 300 ms.

Once the communication link is disconnected in S80, the portable device 50 is operated again in the Poll-mode and the Listen-mode sequentially. However, because the operations of the NFC I/F 22 of the MFP 10 are temporarily stopped in S84, the portable device 50 does not receive a response signal even when receiving a polling signal. The portable device 50 does not receive a polling signal from the MFP 10 either. For this reason, the portable device 50 can detect that the distance between the MFP 10 and the portable device 50 has increased, i.e., that the communication partner thereof has separated.

The reasons that the portable device 50 is caused to detect separation of the communication partner thereof (i.e., that the operation controlling process is executed in S84) are as follows. The communication links corresponding to the CE-mode and the R/W-mode are established under the assumption that the target data is communicated only once. Thus, when a pair of NFC devices communicates the target data in accordance with the CE-mode and the R/W-mode, normally the communication link is disconnected. Subsequently, supposedly when the pair of NFC devices remains close to each other, the pair of NFC devices can execute the Poll-operation and the Listen-operation again, reestablish the communication link, and communicate the same target data. In other words, when the pair of NFC devices remains close to each other, the same target data is communicated a number of times.

Therefore, when separation of the communication partner is not detected after the communication links corresponding to the CE-mode and the R/W-mode are disconnected, the NFC devices are normally programmed in such a manner as not to reestablish communication links even when executing the Poll-operation and the Listen-operation again. When, for example, response signals are not received from the communication partners no matter how many times polling signals are sent, or when polling signals are not received from the communication partner for a predetermined period of time, the NFC devices detect separation of the communication partners thereof. By detecting the separation of the communication partners in this manner, the NFC devices can reestablish communication links with the same communication partners.

In the present embodiment, communication of the second target data is executed subsequent to the communication of the first target data. Therefore, it is necessary to adopt a mechanism for reestablishing a new communication link for communicating the second target data, even when the MFP 10 and the portable device 50 remain close to each other after the communication link for communicating the first target data is disconnected. This mechanism is the operation controlling process of S84. In other words, by causing the MFP 10 to execute the operation controlling process of S84, the portable device 50 can detect separation of the MFP 10, even when the MFP 10 and the portable device 50 remain close to each other. Thereafter, a communication link can be reestablished between the MFP 10 and the portable device 50 as long as the MFP 10 and the portable device 50 execute the Poll-operation and the Listen-operation.

(Poll-Process of MFP; FIGS. 6 and 7)

Contents of the Poll-process of MFP are described hereinafter with reference to FIGS. 6 and 7. As described above, when the NFC I/F 22 executes the Poll-operation, the MFP 10 is operated in either the P2P-mode or the R/W-mode in accordance with the receipt complete operable mode signal. In S110, based on the receipt complete operable mode signal, the CPU 32 determines whether the MFP 10 is to be operated in the P2P-mode or the R/W-mode. When it is determined that the MFP 10 is to be operated in the P2P-mode (YES in S110), the CPU 32 proceeds to S112. When it is determined that the MFP 10 is to be operated in the R/W-mode (NO in S110), the CPU 32 proceeds to S160 shown in FIG. 7.

(Poll-Process of MFP; P2P-mode (FIG. 6))

The steps S110, S112, S114 and S116 are executed according to the protocol stack 38. The steps S118, S124, S126, S128, S134, S136, S137, and S138 are executed according to the application program 36. The steps S120, S122, S130, S132, and S140 are executed using the API of the protocol stack 38 according to the application program 36.

In S112, the CPU 32 sends the Activation command corresponding to the P2P-mode to the portable device 50 via the NFC I/F 22. Next, in S114, the CPU 32 receives a response command (i.e., an OK command), responsive to the Activation command, from the portable device 50 via the NFC I/F 22. As a result, an NFC scheme communication link is established between the MFP 10 and the portable device 50.

Next, in S116, the CPU 32 starts a confirming command transmitting process. In the confirming command transmitting process, the CPU 32 sends the confirming command to the portable device 50 via the NFC I/F 22 and receives a response command (i.e., an OK command), responsive to the confirming command, from the portable device 50 via the NFC I/F 22. Note that, once the CPU 32 starts the confirming command transmitting process in S116, the CPU 32 continues the execution of the confirming command transmitting process until S140 described hereinafter is executed.

The steps S118 to S128 are the same as S18 to S28 shown in FIG. 4. The steps S130 to S137 are the same as S30 to S37 shown in FIG. 4.

In S138, the CPU 32 refers to the disconnection method table 42 in the memory 34, the value of the continuation flag in the memory 34, and the OS information of the portable device 50, to select, from among the plural types of disconnection methods, a disconnection method for disconnecting the communication link established in S114. Because the MFP 10 is the Poll device at the stage of S138, the current situation of the MFP 10 indicates "Poll continuation" or "Poll end." When the continuation flag is "1," the current situation of the MFP 10 indicates "Poll continuation." When the continuation flag is "0," the current situation of the MFP 10 indicates "Poll end." At the stage of S138, the MFP 10 is in the P2P-mode.

For instance, when S138 is executed after S122, in S138 the CPU 32 selects a disconnection method by using the OS information of the portable device 50 that is included in the target data received in S122. On the other hand, when, for example, S138 is executed after S132, in S138 the CPU 32 selects a disconnection method by using the OS information of the portable device 50 that is included in the previous target data received from the portable device 50.

For instance, when the current situation of the MFP 10 indicates "Poll continuation," in S138 the CPU 32 selects a disconnection method according to the OS information of the portable device 50. Specifically, when the OS information of the portable device 50 includes "T1" and "V1," the CPU 32 selects the first hard disconnection. When the OS information of the portable device 50 includes "T1" and "V2," the CPU 32 selects the first soft disconnection. When the OS information of the portable device 50 includes "T2" and "V3," the CPU 32 selects the soft+hard disconnection (see FIG. 2). On the other hand, when, for example, the current situation of the MFP 10 indicates "Poll end," in S138 the CPU 32 selects the first soft disconnection, regardless of the OS information of the portable device 50 (see "any" in FIG. 2).

Subsequently, in S140 the CPU 32 disconnects the communication link established in S114, by using the disconnection method selected in S138. For example, when the disconnection method selected in S138 is the first soft disconnection, in S140 the CPU 32 sends the Deactivation command to the portable device 50 via the NFC I/F 22. The CPU 32 then receives a response command (i.e., an OK command) responsive to the Deactivation command from the portable device 50 via the NFC I/F 22. As a result, the communication link established in S114 is disconnected.

Further, when, for example, the disconnection method selected in S138 is the first hard disconnection, in S140 the CPU 32 stops the operations of the NFC I/F 22 for 200 ms. Therefore, the CPU 32 can no longer execute the confirming command transmitting process, which is started in S116, via the NFC I/F 22. In this case, the portable device 50 determines this situation as a timeout and ends the process concerning the communication link (i.e., the process for monitoring receipt of the confirming command, etc.). As a result, the communication link is disconnected.

When, for example, the disconnection method selected in S138 is the soft+hard disconnection, in S140 the CPU 32 first sends the Deactivation command to the portable device 50 via the NFC I/F 22. The CPU 32 then receives a response command (i.e., an OK command) responsive to the Deactivation command from the portable device 50 via the NFC I/F 22. Thereafter, the CPU 32 temporarily stops the operations of the NFC I/F 22 for 10 ms. As a result, the communication link established in S114 is disconnected. Once S140 is ended, the Poll-process of MFP is ended.

Although not shown in the disconnection method table 42 of FIG. 2 and the flowchart of FIG. 6, when the OS information of the portable device 50 includes type information different from "T1" and "T2" (e.g., "T3" indicating iOS), the CPU 32 may execute two-way communication of a plurality of target data values by using the same communication link without executing S138 and S140 (e.g., without disconnecting the communication link).

(Poll-Process of MFP; R/W-Mode (FIG. 7))

Contents of processes that are executed when the result of S110 of FIG. 6 is determined as NO (when it is determined that the MFP 10 is to be operated in the R/W-mode) are described next with reference to FIG. 7. Note that the steps S160 and S162 are executed according to the protocol stack 38. The steps S164, S168, S170, S172, S176, S178, S182, and S186 are executed according to the application program 36. The steps S165, S166, S173, S174, S180, S184, and S188 are executed using the API of the protocol stack 38 according to the application program 36.

The steps S160 to S164 are the same as the steps S112, S114, and S118 shown in FIG. 6. In S160, however, the CPU 32 sends the Activation command corresponding to the R/W-mode.

When the result of S164 is NO (i.e., when the sending flag is set at "0"), the CPU 32 determines in S165 that the MFP 10 is to be operated according to the Reader-mode. Accordingly, the CPU 32 can read the target data from a pseudo card of the portable device 50 or receive the target data from the portable device 50. The steps S166 to S172 that are executed subsequently are the same as the steps S66 to S72 shown in FIG. 5.

On the other hand, when the result of S164 is YES (i.e., when the sending flag is set at "1"), the CPU 32 determines in S173 that the MFP 10 is to be operated according to the Writer-mode. The CPU 32 therefore can write the target data into the pseudo card of the portable device 50 or send the target data to the portable device 50. The steps S174 to S178 that are executed subsequently are the same as the steps S74 to S78 shown in FIG. 5.

After the step S172 or S178, the Poll-process of MFP proceeds to S180. When the result of S170 or S176 is YES, the Poll-process of MFP proceeds to S186. The step S186 is the same as the step S86 shown in FIG. 5. Once S186 is ended, the Poll-process of MFP proceeds to S188.

In S180 or S188, the CPU 32 first refers to the disconnection method table 42 to select a disconnection method for disconnecting the communication link established in S162. At the stage of S180 or S188, the current situation of the MFP 10 indicates either "Poll continuation" or "Poll end," and the MFP 10 is in the R/W-mode. The CPU 32 selects the first soft disconnection, regardless of the OS information of the portable device 50 (see FIG. 2). In S180 or S188, the CPU 32 uses the selected first soft disconnection to disconnect the communication link established in S162. The details of the first soft disconnection are as described above. When ending S180, the Poll-process of MFP is ended after S182 and S184 are executed. When ending S188, on the other hand, the Poll-process of MFP is ended without having S182 and S184 executed.

In S182, the CPU 32 refers to the operation controlling table 44 in the memory 34 and the OS information of the portable device 50 to select one operation controlling method from among the plural types of operation controlling methods. In S182, the CPU 32 selects an operation controlling method according to the OS information of the portable device 50. For example, in a case where S182 is executed after S166, in S182 the CPU 32 selects an operation controlling method by using the OS information of the portable device 50 that is included in the target data received in S166. Additionally, for example, in a case where S182 is executed after S174, in S182 the CPU 32 selects an operation controlling method by using the OS information of the portable device 50 that is included in the previous target data received from the portable device 50. Specifically, when the OS information of the portable device 50 includes "T1" and "V1," the CPU 32 selects the first hard controlling. When the OS information of the portable device 50 includes "T2" and "V3," the CPU 32 selects the second hard controlling. Note that when the OS information of the portable device 50 includes "T1" and "V2," the CPU 32 skips the process of S184 and ends the Poll-process of MFP without selecting any operation controlling method (see FIG. 3).

In S184, the CPU 32 executes an operation controlling process by using the operation controlling method selected in S182. The first and second hard controlling methods are as described above. The operation controlling process of S184 is executed for the same reason as executing the operation controlling process of S84 shown in FIG. 5.

(Specific Cases)

Specific cases realized by the present embodiment are described next. Each of the following cases is realized by allowing the MFP 10 to execute each of the processes shown in FIGS. 4 to 7. Note that each of the cases simulates a situation in which a series of communications of a plurality of target data values is ended by sending the first target data from the portable device 50 to the MFP 10 and then sending the second target data from the MFP 10 to the portable device 50, as shown in the pattern B of the command table 40 of FIG. 1.

(Case A; FIG. 8)

In the case A, the MFP 10 executes the Poll-operation (i.e., the portable device 50 executes the Listen-operation), and the portable device 50 can be operated according to the P2P-mode. The portable device 50 has the OS program with the type information "T1" and the version information "V1."

The MFP 10 sends the Activation command to the portable device 50 (S112 of FIG. 6) and receives an OK command from the portable device 50 (S114). Consequently, a communication link L1 is established between the MFP 10 and the portable device 50. In this case, the MFP 10 starts the confirming command transmitting process (S116). In other words, the MFP 10 sends the confirming command to the portable device 50 and receives an OK command from the portable device 50.

At this time when the communication link L1 is established, the sending flag is "0." In this case, the MFP 10 determines that the result of S118 is NO, executes the negotiation subsequently, and then informs the portable device 50 of that the MFP 10 executes data reception (S120). The MFP 10 receives the first target data from the portable device 50 (S122). The first target data includes a command to be processed by the MFP 10, and the OS information indicating "T1" and "V1." The MFP 10 processes the command included in the first target data, and creates the second target data (S124). In this case, the MFP 10 sets the sending flag at "1" and the continuation flag at "1" (S128).

The current situation of the MFP 10 is "Poll continuation," the MFP 10 is in the "P2P" mode, and the OS information of the portable device 50 includes "T1" and "V1." Therefore, the MFP 10 selects the first hard disconnection (see S138, FIG. 2). Next, the MFP 10 stops the operations of the NFC I/F 22 for 200 ms in accordance with the selected first hard disconnection (S140). Accordingly, the MFP 10 cannot send a confirming command. The portable device 50 determines this situation as a timeout, resulting in disconnecting the communication link L1.

Thereafter, the MFP 10 executes the Poll-operation again (i.e., the portable device 50 executes the Listen-operation again). The MFP 10 sends the Activation command to the portable device 50 (S112) and receives an OK command from the portable device 50 (S114). As a result, a communication link L2 is established between the MFP 10 and the portable device 50.

When the first target data is communicated, the sending flag is set at "1." Therefore, the MFP 10 determines that the result of S118 as YES, executes the negotiation subsequently, and then informs the portable device 50 of that the MFP 10 executes data sending (S130). The MFP 10 sends the second target data to the portable device 50 (S132). In this case, the MFP 10 sets the sending flag at "0" and the continuation flag at "0" (S137).

The current situation of the MFP 10 is "Poll end," and the MFP 10 is in the "P2P" mode. Therefore, the MFP 10 selects the first soft disconnection (see S138, FIG. 2). The MFP 10 subsequently sends the Deactivation command to the portable device 50 according to the selected first soft disconnection, and receives an OK command from the portable device 50 (S140). As a result, the communication link L2 is disconnected.

As described above, the P2P-mode is a mode for two-way communication. Therefore, considered is a configuration in which both the first target data and the second target data are communicated using the same communication link L1. Nevertheless, the portable device 50 might not be able to appropriately execute two-way communication according to the P2P-mode. For example, when the OS program of the portable device 50 has the type information "T1" and the version information "V1," this OS program does not permit an operation of receiving the second target data using the communication link L1 after the first target data is sent using the same communication link L1.

In view of such circumstances, in the case A, once the MFP 10 receives the first target data from the portable device 50 by using the communication link L1, the communication link L1 is disconnected temporarily. Next, the MFP 10 reestablishes the communication link L2 and sends the second target data to the portable device 50 by using the communication link L2. Thus, even when the portable device 50 does not permit the two-way communication in the P2P-mode, the MFP 10 can appropriately communicate both the first target data and the second target data with the portable device 50 in accordance with the P2P-mode.

A general Poll device normally disconnects a communication link by using the first soft disconnection defined by the NFC forum. However, as described above, in the case A the MFP 10 disconnects the communication link L1 by using the first hard disconnection in place of the first soft disconnection. The reasons are as follows. In other words, in the case A, the OS program of the portable device 50 has the type information "T1" and the version information "V1." In the portable device 50 having such OS information "T1-V1," a fatal error can occur in the protocol stack of the P2P of the portable device 50 when, supposedly, the communication link L1 is disconnected by the first soft disconnection. In case of such error, even when the portable device 50 receives the second target data using the communication link L2, the portable device 50 cannot recognize that the second target data is the data responsive to the first target data. As a result, the portable device 50 cannot appropriately execute the process in accordance with the command included in the second target data (e.g., "instruction command" in the first example described above).

In view of such circumstances, in the present embodiment, the "first hard disconnection" is adopted as a disconnection method corresponding to "Poll continuation," "P2P," and "T1-V1," as shown in FIG. 2. Note that the waiting period (i.e., 200 ms) of the first hard disconnection is set at a period during which the portable device 50 can detect a timeout. Even when the communication link L1 is disconnected by the first hard disconnection, no error is generated in the portable device 50. For this reason, once receiving the second target data by using the communication link L2, the portable device 50 can appropriately execute the process in accordance with the command included in the second target data.

On the other hand, the general "first soft disconnection" defined by the NFC forum is adopted as a disconnection method corresponding to "Poll end" and "P2P," as shown in FIG. 2. As described above, an error might occur in the portable device 50 when the first soft disconnection is used. However, when the situation of the MFP 10 indicates "Poll end," the series of communications of the plurality of target data values is ended; thus, the fact that an error occurs in the portable device 50 is not an issue. Moreover, the first soft disconnection is capable of disconnecting a communication link more promptly than the first hard disconnection. This is because unlike the first hard disconnection, the waiting period of 200 ms is not required in the first soft disconnection, and because, unlike the first hard disconnection, there is not required a return period for the hardware (i.e., the NFC I/F 22) to recover after being disconnected. Thus, the MFP 10 can promptly disconnect the communication link L2 and promptly execute the other processes (e.g., the Poll-operation, Listen-operation).

(Case B; FIG. 9)

In the case B, the MFP 10 executes the Poll-operation (i.e., the portable device 50 executes the Listen-operation), and the portable device 50 can be operated according to the P2P-mode. The portable device 50 has the OS program with the type information "T1" and "V2." The portable device 50 having the OS program with "T1" and "V2" cannot appropriately execute two-way communication according to the P2P-mode, as with the case A. Therefore, in the case B as well, the MFP 10 disconnects the communication link L1 and reestablishes the communication link L2.

In the case B, the MFP 10 disconnects the communication link L1 by using the first soft disconnection. This is the only difference with the case A. In the case B, the OS program of the portable device 50 has the type information "T1" and the version information "V2." In the portable device 50 with such OS information "T1-V2", no error occurs even when the communication link L1 is disconnected by the first soft disconnection.

In view of such circumstances, in the present embodiment, the "first soft disconnection" capable of promptly disconnecting a communication link is adopted as a disconnection method corresponding to "Poll continuation," "P2P," and "T1-V2," as shown in FIG. 2. Therefore, the MFP 10 can promptly disconnect the communication link L1 and promptly reestablishes the communication link L2.

(Case C; FIG. 10)

In the case C, the MFP 10 executes the Poll-operation (i.e., the portable device 50 executes the Listen-operation), and the portable device 50 can be operated according to the P2P-mode. The portable device 50 has the OS program with the type information "T2" and the version information "V3." The portable device 50 having the OS program with "T2" and "V3" cannot appropriately execute two-way communication according to the P2P-mode, as with the case A. Therefore, in the case C as well, the MFP 10 disconnects the communication link L1 and reestablishes the communication link L2.

In the case C, the MFP 10 disconnects the communication link L1 by using the soft+hard disconnection. This is the only difference with the case A. In the case C, the OS program of the portable device 50 has the type information "T2" and the version information "V3." Even when, supposedly, only the first soft disconnection is executed, the portable device 50 with such OS information "T2-V3" cannot appropriately recognize the disconnection of the communication link L1. Because the portable device 50 cannot recognize the disconnection of the communication link L1, the communication link L2 cannot appropriately be established between the MFP 10 and the portable device 50.

In view of such circumstances, in the present embodiment, the "soft+hard disconnection" is adopted as a disconnection method corresponding to "Poll continuation," "P2P," and "T2-V3," as shown in FIG. 2. The soft+hard disconnection is a method for stopping the operations of the NFC I/F 22 for 10 ms after the Deactivation command and an OK command are communicated, as with the first soft disconnection. Once the operations of the NFC I/F 22 are stopped, the portable device 50 cannot execute the NFC scheme communication (e.g., communication of a polling signal and a response signal) with the MFP 10 for that period of time for which the operations of the NFC I/F 22 are stopped. As a result, the portable device 50 can appropriately recognize the disconnection of the communication link L1. Thus, the communication link L2 can appropriately be established between the MFP 10 and the portable device 50.

(Case D; FIG. 11)

In the case D, the MFP 10 executes the Listen-operation (i.e., the potable device 50 executes the Poll-operation), and the portable device 50 can be operated according to the P2P-mode. The portable device 50 has the OS program with the type information "T1" and the version information "V1," or the OS program with the type information "T1" and the version information "V2."

The MFP 10 receives the Activation command from the portable device 50 (S10 of FIG. 4) and sends an OK command to the portable device 50 (S14). Consequently, the communication link L1 is established between the MFP 10 and the portable device 50. In this case, the MFP 10 starts the confirming command responding process (S16). In other words, the MFP 10 receives the confirming command from the portable device 50 and sends an OK command to the portable device 50.

At this point when the communication link L1 is established, the sending flag is "0." Therefore, the MFP 10 determines that the result of S18 is NO, executes the negotiation subsequently, and then informs the portable device 50 of that the MFP 10 executes data reception (S20). The MFP 10 receives the first target data from the portable device 50 (S22). The first target data includes a command to be processed by the MFP 10, and the OS information indicating "T1" and "V1" (or the OS information indicating "T1" and "V2"). The MFP 10 processes the command included in the first target data, and creates the second target data (S24). In this case, the MFP 10 sets the sending flag at "1" and the continuation flag at "1" (S28).

The current situation of the MFP 10 shows "Listen continuation," and the MFP 10 is in the "P2P" mode. When, for example, the OS information of the portable device 50 includes "T1" and "V1," the MFP 10 selects the first hard disconnection (see S38, FIG. 2). When, for example, the OS information of the portable device 50 includes "T1" and "V2," the MFP 10 selects the second hard disconnection (see S38, FIG. 2). Next, the MFP 10 stops the operations of the NFC I/F 22 for 200 ms or 300 ms in accordance with the selected first hard disconnection or second hard disconnection (S40). Accordingly, the MFP 10 does not send an OK command even when the MFP 10 receives the confirming command from the portable device 50. In addition, even when the MFP 10 receives the Deactivation command from the portable device 50, the MFP 10 does not send an OK command. The portable device 50 determines this situation as a timeout, resulting in disconnecting the communication link L1.

Thereafter, the MFP 10 executes the Listen-operation again (i.e., the portable device 50 executes the Poll-operation again). The MFP 10 receives the Activation command from the portable device 50 (S10) and sends an OK command to the portable device 50 (S14). As a result, the communication link L2 is established between the MFP 10 and the portable device 50.

When the first target data is communicated, the sending flag is set at "1." The MFP 10, therefore, determines that the result of S18 is YES, executes the negotiation subsequently, and then informs the portable device 50 of that the MFP 10 executes data sending (S30). The MFP 10 sends the second target data to the portable device 50 (S32). In this case, the MFP 10 sets the sending flag at "0" and the continuation flag at "0" (S37).

The current situation of the MFP 10 is "Listen end," and the MFP 10 is in the "P2P" mode. Therefore, the MFP 10 selects the second soft disconnection (see S38, FIG. 2). Next, the MFP 10 receives the Deactivation command from the portable device 50 and sends an OK command to the portable device 50, in accordance with the selected second soft disconnection (S40). As a result, the communication link L2 is disconnected.

A general Listen device normally disconnects a communication link by using the second soft disconnection defined by the NFC forum. However, as described above, in the case D the MFP 10 disconnects the communication link L2 by using the first hard disconnection or the second hard disconnection in place of the second soft disconnection. The reasons are as follows. In other words, in the case D, the OS program of the portable device 50 has the combination of the type information "T1" and the version information "V1" or the combination of the type information "T1" and the version information "V2." In the portable device 50 having such OS information "T1-V1" or "T1-V2," an error can occur when, supposedly, the communication link L1 is disconnected by the second soft disconnection. In case of such error, the portable device 50 cannot appropriately execute the process in accordance with the command included in the second target data, as described in the case A.

In view of such circumstances, in the present embodiment, the "first hard disconnection" is adopted as a disconnection method corresponding to "Listen continuation," "P2P," and "T1-V1," as shown in FIG. 2. In addition, the "second hard disconnection" is adopted as a disconnection method corresponding to "Listen continuation," "P2P," and "T1-V2," as shown in FIG. 2. The waiting periods (i.e., 200 ms and 300 ms) of the first hard disconnection and the second hard disconnection are set at periods during which the portable device 50 can detect timeouts. The periods during which the portable device 50 having the OS information "T1-V2" can detect timeouts are longer than the periods during which the portable device 50 having the OS information "T1-V1" can detect timeouts. Even when the communication link L1 is disconnected by the first hard disconnection or the second hard disconnection, no error occurs in the portable device 50. For this reason, once receiving the second target data by using the communication link L2, the portable device 50 can appropriately execute the process in accordance with the command included in the second target data.

On the other hand, the "second soft disconnection" capable of promptly disconnecting the communication link is adopted as the disconnection method corresponding to "Listen end" and "P2P," as shown in FIG. 2. Therefore, the MFP 10 can promptly disconnect the communication link L2 and promptly execute the other processes (e.g., the Poll-operation and Listen-operation).

Although irrelevant to the sequence diagrams of FIGS. 8 to 11, the portable device 50 having the OS information "T2-V3" cannot appropriately recognize the disconnection of the communication link L1 when, supposedly, the second soft disconnection is executed. Thus, as shown in FIG. 2, the "second hard disconnection" is adopted as the disconnection method corresponding to "Listen continuation," "P2P," and "T2-V3." The portable device 50 having the OS information "T2-V3" can appropriately recognize the disconnection of the communication link L1 when the second hard disconnection is executed. Consequently, the communication link L2 can appropriately be established between the MFP 10 and the portable device 50.

(Case E; FIG. 12)

In the case E, the MFP 10 executes the Listen-operation (i.e., the portable device 50 executes the Poll-operation), and the portable device 50 cannot be operated according to the P2P-mode (i.e., the portable device 50 can only be operated according to the R/W-mode and the CE-mode). Therefore, the MFP 10 is operated according to the CE-mode and the portable device 50 according to the R/W-mode. The portable device 50 has the OS program with the type information "T1" and the version information "V1," or the OS program with the type information "T1" and the version information "V2."

The MFP 10 receives the Activation command from the portable device 50 (S10 of FIG. 4) and sends an OK command to the portable device 50 (S62 of FIG. 5). Consequently, the communication link L1 is established between the MFP 10 and the portable device 50.

At this time when the communication link L1 is established, the sending flag is "0." In this case, the MFP 10 determines that the result of S64 is NO, and receives the first target data from the portable device 50 (S66). The first target data includes a command to be processed by the MFP 10, and the OS information indicating "T1" and "V1" (or the OS information indicating "T1" and "V2"). The MFP 10 processes the command included in the first target data, and creates the second target data (S68). In this case, the MFP 10 sets the sending flag at "1" and the continuation flag at "1" (S72).

The current situation of the MFP 10 is "Listen continuation," and the MFP 10 is in the "CE" mode. Therefore, the MFP 10 selects the second soft disconnection, regardless of the OS information of the portable device 50 (see S80, FIG. 2). Next, the MFP 10 receives the Deactivation command from the portable device 50 in accordance with the selected second soft disconnection, and sends an OK command to the portable device 50 (S80). As a result, the communication link L1 is disconnected.

Subsequently, the MFP 10 selects an operation controlling method (S82). For example, in a case where the OS information of the portable device 50 includes "T1" and "V1," the MFP 10 selects the first hard controlling (see S82, FIG. 3). In a case where, for example, the OS information of the portable device 50 includes "T1" and "V2," the MFP 10 selects the second hard controlling (see S82, FIG. 3). Subsequently, the MFP 10 stops the operations of the NFC I/F 22 for 200 ms or 300 ms in accordance with the selected first hard controlling or second hard controlling (S84). In other words, even when the MFP 10 receives a polling signal from the portable device 50, the MFP 10 does not send a response signal (i.e., the NFC I/F 22 does not execute the Listen-operation for a while). Furthermore, the MFP 10 does not send a polling signal to the portable device 50 (i.e., the NFC I/F 22 does not execute the Poll-operation for a while). Consequently, the portable device 50 detects separation of the MFP 10. As a result, even when the MFP 10 and the portable device 50 remain close to each other, the communication link L2 described hereinafter can appropriately be established.

Thereafter, the MFP 10 executes the Listen-operation again (i.e., the portable device 50 executes the Poll-operation again). The MFP 10 receives the Activation command from the portable device 50 (S10 of FIG. 4), and sends an OK command to the portable device 50 (S62 of FIG. 5). As a result, the communication link L2 is established between the MFP 10 and the portable device 50.

When the first target data is communicated, the sending flag is set at "1." The MFP 10, therefore, determines that the result of S64 of FIG. 5 is YES, and sends the second target data to the portable device 50 (S74). In this case, the MFP 10 sets the sending flag at "0" and the continuation flat at "0" (S86).

The current situation of the MFP 10 shows "Listen end," and the MFP 10 is in the "CE" mode. Thus, the MFP 10 selects the second soft disconnection regardless of the OS information of the portable device 50 (see S88, FIG. 2). Next, the MFP 10 receives the Deactivation command from the portable device 50 in accordance with the selected second soft disconnection, and sends an OK command to the portable device 50 (S88). As a result, the communication link L2 is disconnected.

As described above, the R/W-mode and the CE-mode are the modes for one-way communication. Thus, both the first and second target data cannot be communicated using the same communication link L1. In the present embodiment, when the MFP 10 receives the first target data from the portable device 50 by using the communication link L1, as shown in the case E, the communication link L1 is disconnected. Next, the MFP 10 reestablishes the communication link L2 and sends the second target data to the portable device 50 by using the communication link L2. Therefore, even when the MFP 10 and the portable device 50 are operated according to the R/W-mode and the CE-mode, the MFP 10 can appropriately communicate the first target data and the second target data with the portable device 50. In other words, the MFP 10 can realize pseudo two-way communication.

In the present embodiment, the "second soft disconnection" capable of promptly disconnecting communication link is adopted as the disconnection method corresponding to "CE," regardless of the OS information of the portable device 50, as shown in FIG. 2. Therefore, the MFP 10 can promptly disconnect the communication link and promptly execute the other processes.

As shown in FIG. 3, the "first hard controlling" is adopted as the operation controlling method corresponding to "Listen continuation," "CE," and "T1-V1." Moreover, as shown in FIG. 3, the "second hard controlling" is adopted as the operation controlling method corresponding to "Listen continuation," "CE," and "T1-V2." The waiting periods (i.e., 200 ms and 300 ms) of the first hard controlling and the second hard controlling are set at periods during which the portable device 50 can detect separation of the communication partner thereof. The periods during which the portable device 50 having the OS information "T1-V2" can detect separation of the communication partner thereof are longer than the periods during which the portable device 50 having the OS information "T1-V1" can detect separation of the communication partner thereof. Because the first or second hard controlling is executed in accordance with the OS information of the portable device 50, the MFP 10 can cause the portable device 50 to appropriately detect separation of the communication partner thereof.

Although irrelevant to the sequence diagram of FIG. 12, the "second hard controlling" is adopted as the operation controlling method corresponding to "Listen continuation," "CE," and "T2-V3," as shown in FIG. 3. The portable device 50 having the OS information "T2-V3" can detect separation of the communication partner thereof, once the second hard controlling is executed. The MFP 10 can cause the portable device 50 to appropriately detect separation of the communication partner thereof.

Operation controlling methods corresponding to "Listen end" and "CE" are not described, as shown in FIG. 3. This means that the operation controlling processes are not executed. Because the series of communications of the plurality of target data values are ended, the user of the portable device 50 separates the portable device 50 from the MFP 10. As a result, even when no operation controlling processes are executed, the portable device 50 can detect separation of the communication partner thereof. Therefore, the MFP 10 does not execute any operation controlling process. As a result, the MFP 10 can promptly execute the other processes.

(Other Cases)

Although sequence diagrams for the other cases are omitted, the "first soft disconnection" is adopted as the disconnection method corresponding to "Poll continuation" and "R/W," as shown in FIG. 2. Also, the "first soft disconnection" is adopted as the disconnection method corresponding to "Poll end" and "R/W." Thus, the MFP 10 can promptly disconnect the communication link and promptly execute the other processes.

In addition, the "first hard controlling" is adopted as the operation controlling method corresponding to "Poll continuation," "T1-V1," and "R/W," as shown in FIG. 3. The "second hard controlling" is adopted as the operation controlling method corresponding to "Poll continuation," "T2-V3," and "R/W." Because the first or second hard controlling is executed in accordance with the OS information of the portable device 50, the MFP 10 can cause the portable device 50 to appropriately detect separation of the communication partner thereof. Note that FIG. 3 does not describe the operation controlling method corresponding to "Poll continuation," "T1-V2," and "R/W." The portable device 50 having the OS information "T1-V2" can appropriately detect separation of the communication partner thereof, once the communication link is disconnected, even when no operation controlling processes are executed. The MFP 10, therefore, does not execute any operation controlling processes. As a result, the MFP 10 can promptly execute the other processes.

Further, the operation controlling method corresponding to "Poll end" and "R/W" is not described in FIG. 3. Because the series of communications of the plurality of target data values is ended, the user of the portable device 50 separates the portable device 50 from the MFP 10. Thus, even when no operation controlling processes are executed, the portable device 50 can detect separation of the communication partner thereof. Consequently, the MFP 10 does not execute any operation controlling processes. As a result, the MFP 10 can promptly execute the other processes.

(Correlations)

The MFP 10 and the portable device 50 are the examples of "communication device" and "external device," respectively. The Activation command is the example of "first establishing command" and "second establishing command." The Deactivation command is the example of "disconnection command." The communication link L1 and the communication link L2 are the examples of "first communication link" and "second communication link," respectively. The OS information is the example of "related information." The command table 40 shown in FIG. 1 is the example of "communication continuation information."

The OS information "T1-V1," the OS information "T1-V2," and the OS information "T2-V3" are the examples of "first related information," "second related information," and "third related information," respectively. The first hard disconnection selected in the case A of FIG. 8, the first soft disconnection selected in the case B of FIG. 9, the soft+hard disconnection selected in the case C of FIG. 10, the second hard disconnection selected in the case D of FIG. 11, and the second soft disconnection selected in the case E of FIG. 12 are the examples of "first type of disconnection method," "second type of disconnection method," "third type of disconnection method," "fourth type of disconnection method," and "fifth type of disconnection method." The "first soft controlling" or "second soft controlling" corresponding to "Poll end" or "Listen end" shown in FIG. 2 is the example of the "predetermined type of disconnection method." The period of 200 ms for the first hard disconnection (or the first hard controlling) and the period of 300 ms for the second hard disconnection (or the second hard controlling) are the examples of the "first period" and "second period."

The steps S10 and S14 of FIG. 4, the step S62 of FIG. 5, the steps S112 and S114 of FIG. 6, and the steps S160 and S162 of FIG. 7, are the examples of the "first establishing step (and first establishing module)" and "second establishing step (and second establishing module)." The step S22 of FIG. 4, the step S66 of FIG. 5, the step S122 of FIG. 6, and the step S166 of FIG. 7, are the examples of the "receiving step (and receiving module)." The step S24 of FIG. 4, the step S68 of FIG. 5, the step S124 of FIG. 6, and the step S168 of FIG. 7, are the examples of the "creating step (and creating module)." The step S38 of FIG. 4, the steps S80 and S88 of FIG. 5, the step S138 of FIG. 6, and the steps S180 and S188 of FIG. 7, are the examples of the "selecting step (selecting module)." The step S40 of FIG. 4, the steps S80 and S88 of FIG. 5, the step S140 of FIG. 6, and the steps S180 and S188 of FIG. 7, are the examples of the "disconnecting step (disconnecting module)." The step S32 of FIG. 4, the step S74 of FIG. 5, the step S132 of FIG. 6, and the step S174 of FIG. 7, are the examples of the "sending step (and sending module)." The steps S82 and S84 of FIG. 5 and the steps S182 and S184 of FIG. 7 are the examples of the "operation controlling step." The steps S26 and S34 of FIG. 4, the steps S70 and S76 of FIG. 5, the steps S126 and S134 of FIG. 6, and the steps S170 and S176 of FIG. 7, are the examples of the "determination step."

(Modification 1)

The "communication device" is not limited to the multifunction peripheral (i.e., the MFP 10) capable of executing the printing function and the scanning function, and, therefore, may be a printer capable of executing only the printing function out of the printing function and the scanning function or may be a scanner capable of executing only the scanning function out of the printing function and the scanning function. The "communication device" may be a device that executes a function different from the printing function and the scanning function (e.g., an image display function, a data calculation function) (e.g., a PC, server, portable terminal (cellular phone, smartphone, PDA, etc.)). In other words, the "communication device" includes various devices capable of executing the NFC scheme communications.

(Modification 2)

The "related information" may not be limited to the OS information but may be any type of information as long as it relates to the communication program with which the external device executes the NFC scheme communication. For example, the "related information" may be specific information for specifying the protocol stack installed in the portable device 50 (e.g., the identification number of the protocol stack, the name of the company providing the protocol stack, etc.). In addition, the "related information" may be the name of the vendor of the portable device 50. In the present modification, the tables 42, 44 shown in FIGS. 2, 3 are provided with the column for the specific information and the column for the vendor name, in place of the column for the OS information.

(Modification 3)

The "plural types of disconnection methods" may include not only those five disconnection methods described in FIG. 2, but also the other disconnection methods according to the OS information of the portable device 50. For example, the "plural types of disconnection methods" may include third hard disconnection for temporarily stopping the operations of the NFC I/F 22 for a period other than 200 ms or 300 ms (e.g., 400 ms). In the present modification, the first hard disconnection and the third hard disconnection are the examples of the "first type of disconnection method" and the "second type of disconnection method." Generally speaking, the first and second types of disconnection methods may be different from each other. Similarly, the first and third types of disconnection methods (or the first and fourth types of disconnection methods) may be different from each other. Note that the second, third, and fourth types of disconnection methods may be different from one another or the same.

(Modification 4)

In the foregoing embodiment, the processes of FIG. 4 to FIG. 7 are realized by a software (i.e., the programs 36, 38). Nevertheless, at least one process of FIG. 4 to FIG. 7 may alternately be realized by a hardware resource such as a logic circuit.

What is claimed is:

1. A communication device configured to communicate target data with an external device according to a Near Field Communication (NFC) scheme complying with an NFC standard, the communication device comprising:
   an NFC interface configured to perform communication under the NFC scheme;
   a processor; and
   a memory storing computer executable instructions that, when executed by the processor, cause the communication device to execute:
      a first establishing step of communicating a first establishing command with the external device via the NFC interface so as to establish a first communication link between the communication device and the external device;
      a receiving step of receiving first target data from the external device via the NFC interface by using the first communication link;
      a first NFC controlling step including:
         a first disconnection step of disconnecting the first communication link after executing the receiving step; and
         an operation controlling step of temporarily stopping operation of the NFC interface after disconnecting the first communication link;
      a second establishing step of communicating a second establishing command with the external device via the NFC interface after executing the first NFC controlling step, so as to establish a second communication link between the communication device and the external device;
      a sending step for sending second target data to the external device via the NFC interface by using the second communication link; and
      a second NFC controlling step including a second disconnection step of disconnecting the second communication link after executing the sending step, wherein the second NFC controlling step does not include the operation controlling step,
   wherein the operation controlling step includes:
      sending a stop instruction for stopping an operation of the NFC interface to the NFC interface after disconnecting the first communication link; and
      sending a restart instruction for restarting an operation of the NFC interface to the NFC interface after a predetermined time period has elapsed.

2. The communication device as in claim 1, wherein unless the first NFC controlling step and the second establishing step are executed, the second target data is not sent to the external device even if the first establishing step is executed.

3. The communication device as in claim 1, wherein the operation controlling step includes stopping a supply of power to the NFC interface for the predetermined time period after disconnecting the first communication link.

4. The communication device as in claim 1, wherein:
   the receiving step is executed in a state where the communication device operates in a Reader mode of the NFC standard and the external device operates in a Card Emulation mode of the NFC standard, and
   the sending step is executed in a state where the communication device operates in a P2P mode of the NFC standard and the external device operates in the P2P mode of the NFC standard.

5. The communication device as in claim 4, wherein:
   the first target data includes related information which is related to a communication program for the external device to perform a communication of the NFC scheme, and
   the operation controlling step includes:
      temporarily stopping operation of the NFC interface for a first period after disconnecting the first communication link, in a case where the first target data includes first type information indicating a type of a first communication program; and
      temporarily stopping operation of the NFC interface for a second period different from the first period after disconnecting the first communication link, in a case where the first target data includes second type information indicating a type of a second communication program different from the first communication program.

6. The communication device as in claim 4, wherein:
   the first target data includes related information which is related to a communication program for the external device to perform a communication under the NFC scheme,
   the operation controlling step is executed after disconnecting the first communication link, in a case where the first target data includes first type information indicating a type of a first communication program and first version information indicating a first version of the first communication program, and
   the operation controlling step is not executed after disconnecting the first communication link, in a case where the first target data includes the first type information and second version information indicating a second version of the first communication program which is different from the first version.

7. A non-transitory computer readable medium storing computer readable instructions that, when executed by a processor, cause a communication device to perform:
   a first establishing step of communicating a first establishing command with an external device via a Near Field Communication (NFC) interface of the communication device so as to establish a first communication link between the communication device and the external device, the external device being external to the communication device;
   a receiving step of receiving first target data from the external device via the NFC interface by using the first communication link;
   a first NFC controlling step including:
      a first disconnection step of disconnecting the first communication link after executing the receiving step; and
      an operation controlling step of temporarily stopping operation of the NFC interface after disconnecting the first communication link;
   a second establishing step of communicating a second establishing command with the external device via the NFC interface after executing the first NFC controlling step, so as to establish a second communication link between the communication device and the external device;
   a sending step for sending second target data to the external device via the NFC interface by using the second communication link; and
   a second NFC controlling step including a second disconnection step of disconnecting the second communication link after executing the sending step, wherein the second NFC controlling step does not include the operation controlling step, wherein the operation controlling step includes:
sending a stop instruction for stopping an operation of the NFC interface to the NFC interface after disconnecting the first communication link; and
sending a restart instruction for restarting an operation of the NFC interface to the NFC interface after a predetermined time period has elapsed.

8. A Communication device configured to communicate target data with an external device according to a Near Field Communication (NFC) scheme complying with an NFC standard, the communication device comprising;
an NFC interface configured to execute a communication under the NFC scheme;
a processor; and
a memory storing computer executable instructions that, when executed by the processor, cause the communication device to execute:
a first establishing step for communicating a first establishing command with the external device via the NFC interface so as to establish a first communication link between the communication device and the external device;
a receiving step for receiving first target data from the external device via the NFC interface by using the first communication link;
a first NFC controlling step including:
a first disconnection step for disconnecting the first communication link after executing the receiving step; and
an operation controlling step for temporarily stopping an operation of the NFC interface after disconnecting the first communication link;
a second establishing step for communicating a second establishing command with the external device via the NFC interface after executing the first NFC controlling step, so as to establish a second communication link between the communication device and the external device;
a sending step for sending second target data to the external device via the NFC interface by using the second communication link; and
a second NFC controlling step including a second disconnection step for disconnecting the second communication link after executing the sending step, wherein the second NFC controlling step does not include the operation controlling step,
wherein the operation controlling step includes stopping a supply of power to the NFC interface for a predetermined time period after disconnecting the first communication link.

9. The communication device as in claim 8, wherein unless the first NFC controlling step and the second establishing step are executed, the second target data is not sent to the external device even if the first establishing step is executed.

10. The communication device as in claim 8, wherein:
the receiving step is executed under a state where the communication device operates in a Reader mode of the NFC standard and the external device operates in a Card Emulation mode of the NFC standard, and
the sending step is executed under a state where the communication device operates in a P2P mode of the NFC standard and the external device operates in the P2P mode of the NFC standard.

11. The communication device as in claim 10, wherein:
the first target data includes related information which is related to a communication program for the external device to perform a communication of the NFC scheme, and
the operation controlling step includes:
temporarily stopping operation of the NFC interface for a first period after disconnecting the first communication link, in a case where the first target data includes first type information indicating a type of a first communication program; and
temporarily stopping operation of the NFC interface for a second period different from the first period after disconnecting the first communication link, in a case where the first target data includes second type information indicating a type of a second communication program different from the first communication program.

12. The communication device as in claim 10, wherein:
the first target data includes related information which is related to a communication program for the external device to perform a communication under the NFC scheme,
the operation controlling step is executed after disconnecting the first communication link, in a case where the first target data includes first type information indicating a type of a first communication program and first version information indicating a first version of the first communication program, and
the operation controlling step is not executed after disconnecting the first communication link, in a case where the first target data includes the first type information and second version information indicating a second version of the first communication program which is different from the first version.

13. A non-transitory computer readable medium storing instructions that, when executed by a processor of a communication device, cause the communication device to perform:
a first establishing step for communicating a first establishing command with an external device, via a Near Field Communication (NFC) interface configured to execute a communication under a NFC scheme complying with an NFC standard, so as to establish a first communication link between the communication device and the external device;
a receiving step for receiving first target data from the external device via the NFC interface by using the first communication link;
a first NFC controlling step including:
a first disconnection step for disconnecting the first communication link after executing the receiving step; and
an operation controlling step for temporarily stopping an operation of the NFC interface after disconnecting the first communication link;
a second establishing step for communicating a second establishing command with the external device via the NFC interface after executing the first NFC controlling step, so as to establish a second communication link between the communication device and the external device;
a sending step for sending second target data to the external device via the NFC interface by using the second communication link; and
a second NFC controlling step including a second disconnection step for disconnecting the second communication link after executing the sending step, wherein the second NFC controlling step does not include the operation controlling step,
wherein the operation controlling step includes stopping a supply of power to the NFC interface for a predetermined time period after disconnecting the first communication link.

\* \* \* \* \*